United States Patent
Berg et al.

(12)
(10) Patent No.: US 6,619,100 B2
(45) Date of Patent: Sep. 16, 2003

(54) CRIMPING TOOL FOR METAL HUB PLATE

(75) Inventors: Thomas E. Berg, Fort Collins, CO (US); Rene D. Kumar, Lafayette, CO (US); Glenn E. Sturgis, Denver, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 244 days.

(21) Appl. No.: 09/745,597

(22) Filed: Dec. 21, 2000

(65) Prior Publication Data

US 2003/0005742 A1 Jan. 9, 2003

(51) Int. Cl.[7] ............................. B21D 5/16; B21D 53/00
(52) U.S. Cl. .............................. 72/402; 72/452.9
(58) Field of Search ..................... 72/402, 401, 452.9, 72/398; 29/243.517, 243.529, 243.57, 243.58

(56) References Cited

U.S. PATENT DOCUMENTS

| | | | | |
|---|---|---|---|---|
| 1,750,290 A | * | 3/1930 | Valentine | 72/402 |
| 2,225,345 A | * | 12/1940 | Lamoreaux | 72/402 |
| 2,302,674 A | * | 11/1942 | Carter | 72/402 |
| 3,029,665 A | * | 4/1962 | Baugh | 72/402 |
| 3,657,797 A | | 4/1972 | Robinson | 29/432 |
| 3,713,574 A | * | 1/1973 | Lewis | 72/452.9 |
| 4,043,172 A | * | 8/1977 | Schmittou | 72/402 |
| 4,504,166 A | | 3/1985 | Morin | 403/147 |
| 4,981,743 A | | 1/1991 | Ho | 428/64 |
| 5,073,951 A | | 12/1991 | Hayashi | 382/8 |
| 5,080,736 A | | 1/1992 | Matsui | 156/64 |
| 5,709,764 A | | 1/1998 | Funawatari et al. | 156/275.7 |
| 5,774,440 A | | 6/1998 | Kimura et al. | 369/59 |
| 5,874,147 A | | 2/1999 | Bojarczuk, Jr. et al. | 428/641 |
| 6,153,063 A | | 11/2000 | Yamada et al. | 204/192.22 |
| 6,154,441 A | | 11/2000 | Sandstrom et al. | 369/282 |

FOREIGN PATENT DOCUMENTS

| | | |
|---|---|---|
| EP | 0084713 | 8/1983 |
| EP | 0 301 829 | 2/1989 |
| EP | 0 301 866 | 2/1989 |
| EP | 0 386 971 | 9/1990 |
| EP | 0 475 197 | 3/1992 |
| EP | 0 488 388 | 6/1992 |
| EP | 0 519 768 | 12/1992 |
| EP | 0 555 486 | 8/1993 |
| EP | 0 802 530 | 10/1997 |
| GB | 2 203 886 | 10/1998 |
| JP | 03032433 | 2/1991 |
| JP | 07178461 | 7/1995 |
| SU | 1346383 | 10/1987 |
| WO | WO 00/72312 | 11/2000 |
| WO | WO 00/79526 | 12/2000 |

OTHER PUBLICATIONS

XP002209982; Database WPI, Section PQ, Week 199004; Derwent Publication Ltd., London, GB;, AN1990–028576.

* cited by examiner

*Primary Examiner*—Daniel C. Crane
(74) *Attorney, Agent, or Firm*—MacPherson Kwok Chen & Heid LLP

(57) ABSTRACT

A crimping tool is used to attach a metal hub plate to a plastic hub for a data storage disk. The hub is bonded to the data storage disk, and the metal hub plate allows the disk to be magnetically clamped to a spindle of a disk drive. The metal hub plate has a four tabs which are bent into respective recessed areas of the hub. The tool includes a plunger which is directed against the metal hub plate which the plate is held in a lower die assembly. The plunger includes four crimping jaws which slide against angled surfaces of the plunger. The sliding motion causes the crimping jaws to move radially inward towards each other. The lower surface of each jaw includes a cam surface and a prow. The cam surface slides against the tab, bending it to a predetermined shape, and then the prow contacts a base of the tab to bend it beyond the predetermined shape. In this way, the tabs, which are typically made of a resilient metal, are forced into the recessed areas and remain entirely within the recessed areas despite any spring-back that may occur after the bending has been completed.

10 Claims, 26 Drawing Sheets

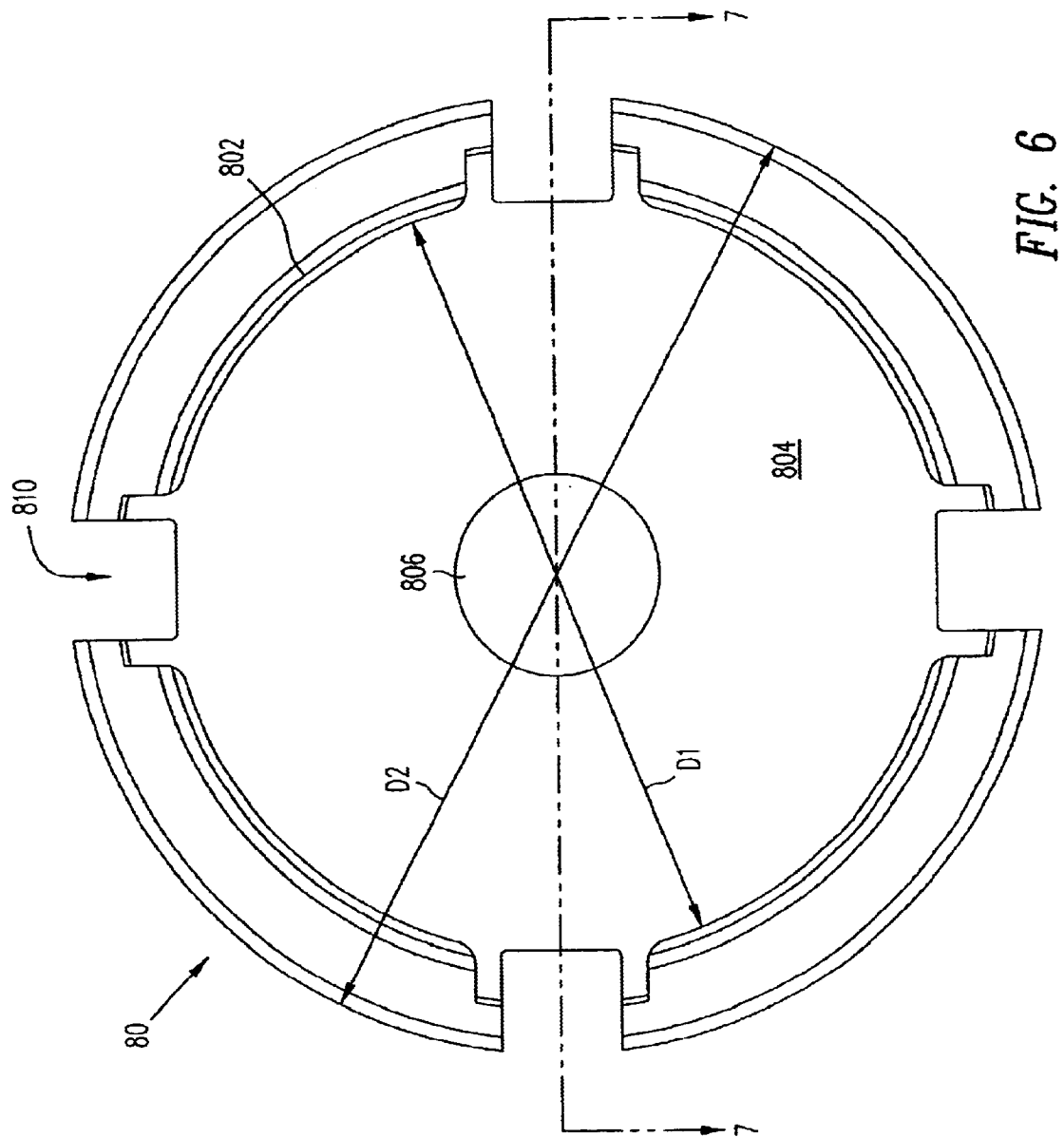

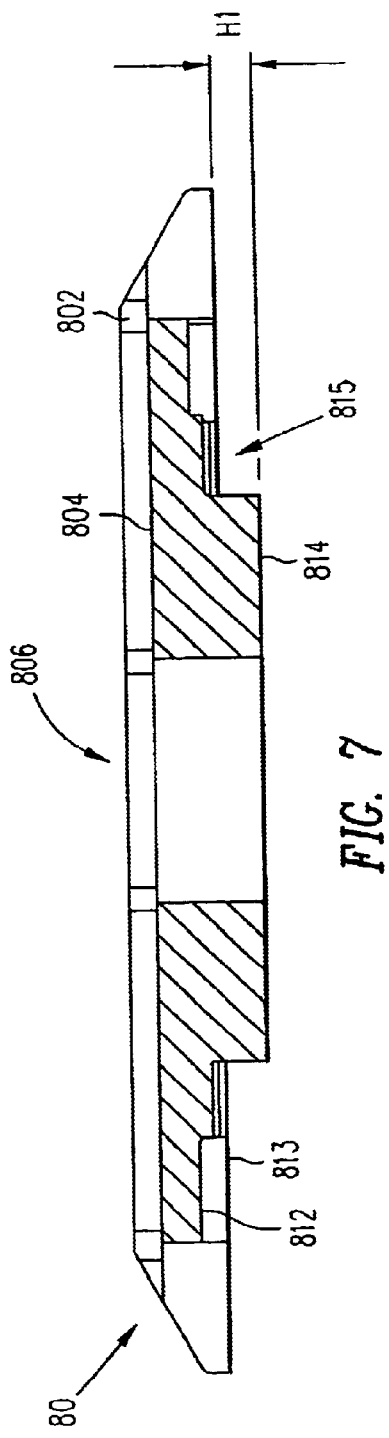
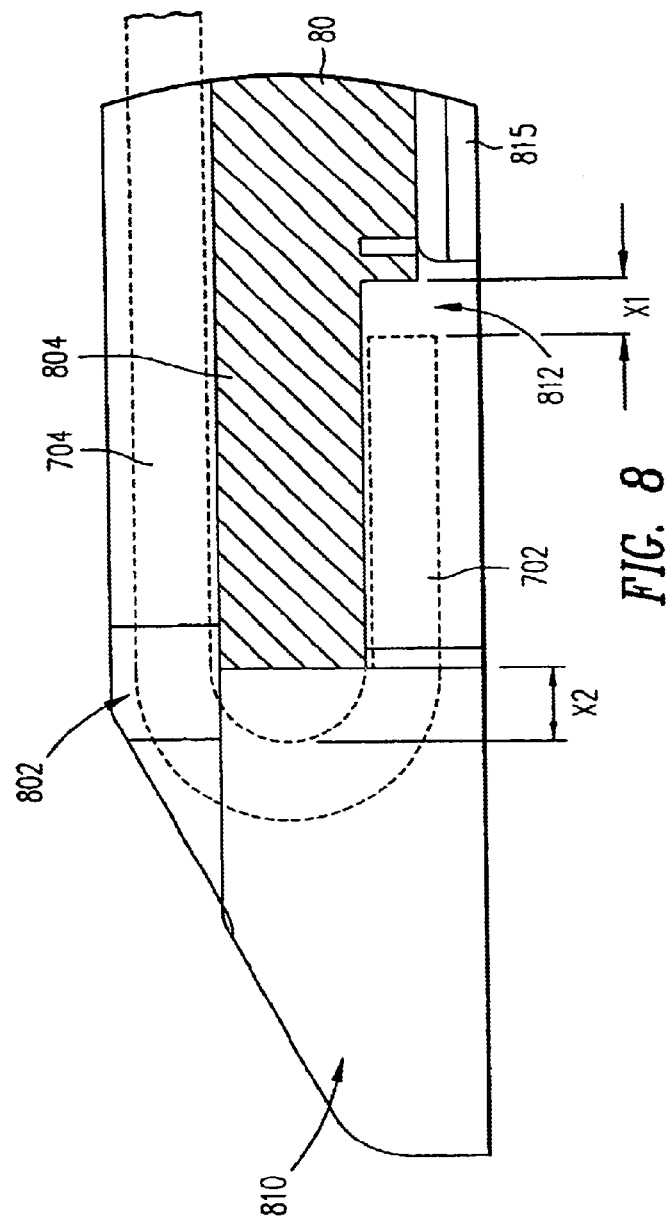

CRIMPING TOOL FOR METAL HUB PLATE

CROSS-REFERENCE TO RELATED APPLICATIONS

This application is related to application Ser. No. 09/745,399, filed herewith, entitled "Method Of Aligning And Mounting Hub Member on Data Storage Disk"; and application Ser. No. 09/746,265, filed herewith, entitled "Magnetic Hub Assembly For Data Storage Disk", each of which is incorporated herein by reference in its entirety.

FIELD OF THE INVENTION

This invention relates to data storage disks and, in particular, to a tool for applying a metal hub plate to a hub of a data storage disk.

BACKGROUND OF THE INVENTION

With the miniaturization of various electronic devices, such as personal electronic devices (PEDs) and digital cameras, a suitable storage medium capable of storing the large quantities of data required by these devices is needed. Magnetic storage devices typically do not have the required capacity. Flash memories have sufficient capacity, but the cost per megabyte is prohibitive for most applications. Compact discs (CDs) and digital versatile disks (DVDs) are generally too large for use with these very small devices.

Accordingly, it would be desirable to have an optical disk that is small (for example, between 25 and 40 mm in diameter) and that is recorded on both sides. This would take advantage of: (1) the recording density available on optical disks, (2) the permanence of optically recorded data, and (3) the capacity allowed by having the data stored on both sides of the disk.

A number of problems must be solved to make such a storage disk a reality. To permit recording on both sides of the disk, the data must be stored on the "first surface" of the disk, i.e., the surface facing the read-write head, rather than the "second surface", as is the case with CDs and DVDs. The disk must be mounted on the spindle of the disk drive in a highly repeatable manner and in a manner that permits a very accurate alignment between the axis of the rotation of the spindle and the geometric center of the data tracks on the disk (whether the tracks are spiral or circular). Otherwise, undue run-out will be experienced and tracking will be difficult. Moreover, since the data patterns on the opposite sides of the disk are not normally coincident, separate axes of rotation are required depending on which side of the disk is being read. The disk must also be mounted very accurately in a direction perpendicular to the recording surface to allow the read-write light beam to be accurately focused on the recording surface. The profile of the disk in the direction of the axis of rotation should be as small as possible to minimize the equivalent dimension of the electronic device. A method must be provided to clamp the disk to the spindle securely enough to prevent slippage when the spindle motor accelerates the disk, but without physically deforming the disk.

SUMMARY OF THE INVENTION

The above-referenced application Ser. No. 09/560,781, now abandoned, describes a hub assembly which includes a hub member, typically made of plastic, and a metal washer or hub plate that is attached to the hub member. The hub plate is made of a metal, such as a mild steel, that is magnetically attractive. The hub assembly is loosely fitted within the central hole of a data storage disk, allowing the hub assembly to be adjusted with respect to the disk in order to align a central bore of the hub assembly with the geometric center of the data tracks on the disk. Two hub assemblies are attached to opposite sides of the disk, each hub assembly being positioned concentrically with respect to the data tracks on one side of the disk. A magnet is positioned in the disk drive, and the magnetic force between the magnet and the metal hub plate is used to clamp the hub assembly and attached disk to the spindle of the disk drive. Alternatively, the plate itself may be made of a magnetic material.

As pointed out in application Ser. No. 09/560,781, since the plastic hub member and metal hub plate have different thermal expansion coefficients, to avoid unwanted fracturing or distortion of the plastic hub member the hub member must be allowed to expand or contract relative to the metal hub plate. This is accomplished by providing the metal hub plate with four tabs which are bent around the hub member. The tabs are located at right angles with respect to each other around the perimeter of the metal hub plate. After bending, each of the tabs fits into a slot or notch in the plastic hub member in a way that allows the hub member to expand or contract, while contact between the sides of the four tabs and the sidewalls of the notches positions the metal hub plate accurately with respect to the hub member. Since the tabs are only, for example, 1 mm wide, any differential thermal expansion between the tab and the metal hub plate in a direction transverse to the tab is not sufficient to fracture or distort the hub member.

Thus, when the hub assembly is attached (e.g, with a UV-curable adhesive) to a data storage disk, the alignment between the central bore of the metal hub plate and the geometric center of the data tracks is fixed while the plastic hub member is allowed to expand or contract with respect to the metal hub plate as the temperature of the disk and hub assembly varies. To avoid undue wear, the central bore of the plastic hub member is preferably made slightly larger than the central bore of the metal hub plate, and the spindle of the disk drive is fitted into the central bore of the metal hub plate. The hub member is preferably made of the same material as the disk, or at least a material which has a very similar coefficient of thermal expansion. Therefore, differential thermal expansion between the hub member and the disk is not a problem.

According to this invention, a crimping tool is described for mounting the metal hub plate onto the plastic hub member. In order for the hub assembly to perform satisfactorily, several conditions must be met: (1) the tabs of the metal hub plate must fit securely against the sidewalls of the notches in the hub member to fixedly position the metal hub plate with respect to the hub member; (2) there must be enough clearance between the tabs and the metal hub plate to allow differential thermal expansion between the hub member and the metal hub plate (i.e., the metal hub plate must not be clamped too tightly against the hub member); (3) the process of bending the tabs should create no burrs on the surface of the tabs; (4) after the bending is completed, all portions of the tabs should be depressed into the notches so that the hub member can be bonded to a disk without interference from the tabs.

A crimping tool according to this invention includes plunger having a central axis and being moveable along said central axis. The plunger comprises a plurality of crimping jaws positioned radially with respect to said central axis, the crimping jaws being subjected to a force such that said crimping jaws project from an end of said plunger. The plunger also includes a plurality of surfaces oriented at an acute angle with respect to said central axis, each of said crimping jaws being slidable on a respective one of said surfaces such that when one of said crimping jaws slides on said respective one of said surfaces, the motion of said crimping jaw has a first component parallel to said axis and a second component perpendicular to said axis. The surfaces are oriented such that the crimping jaws move towards the central axis when said crimping jaws are moved in a direction opposite to the force. A die is positioned in the tool such that the crimping jaws contact said die when said plunger is displaced a distance from a retracted position in the direction of said force along said axis.

The die comprises a cavity for retaining said metal hub plate.

BRIEF DESCRIPTION OF THE DRAWINGS

FIG. 6 is a plan view of the hub member from the side on which the metal hub plate fits.

FIG. 7 is a cross-sectional view of the hub member taken at section 7—7 shown in FIG. 6.

FIG. 8 is a cross-sectional view of the notch area of the hub member.

DESCRIPTION OF THE INVENTION

Figure 1:
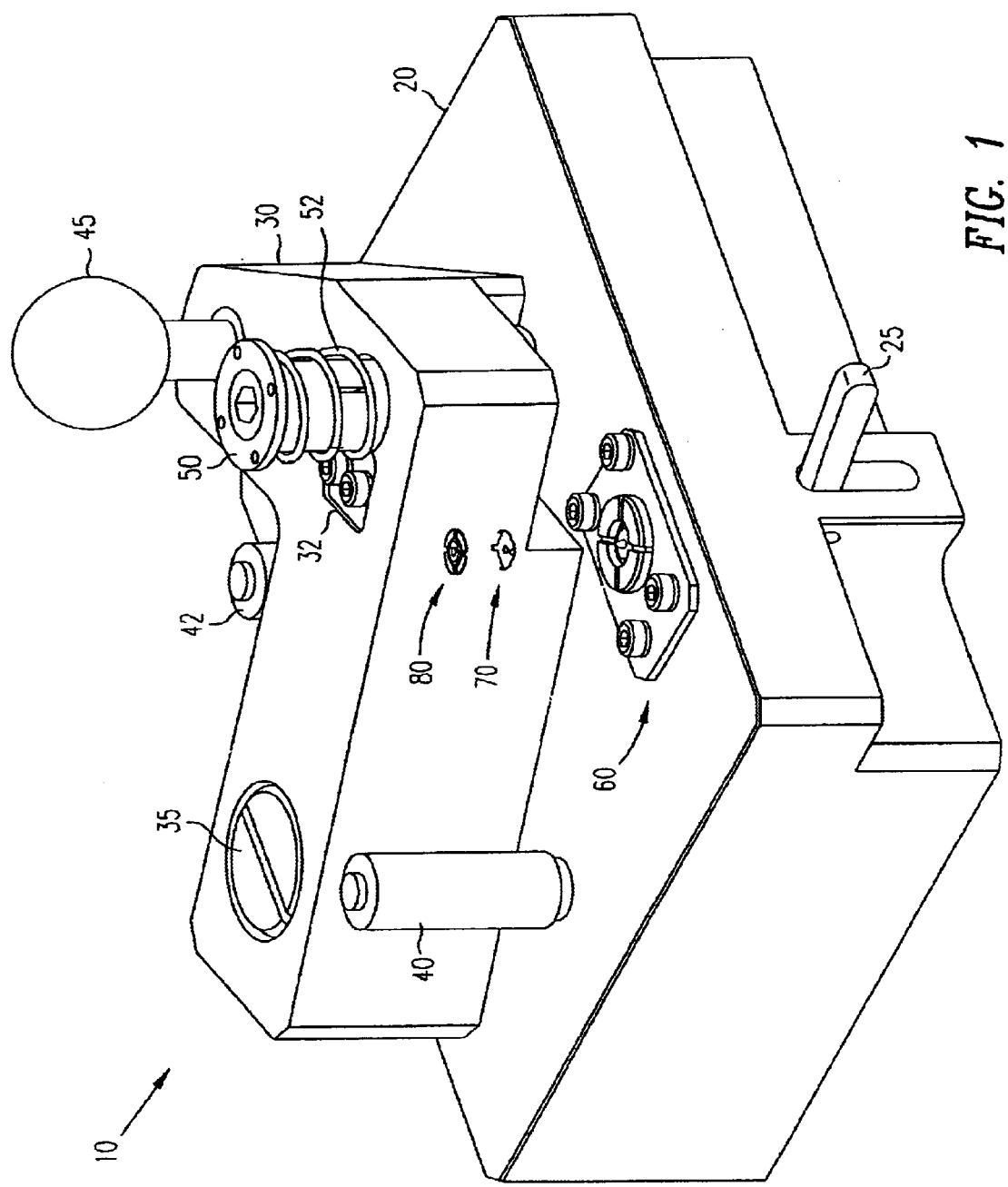
FIG. 1 is a perspective view of a crimping tool in accordance with this invention.

FIG. 1 shows an overall view of a crimping tool according to this invention. Crimping tool 10 includes a base 20 and an upper swivel body 30, which pivots on base 20 about a swivel pin 35 between limits defined by stops 40 and 42. A locking pin 45 extends through upper swivel body 30 and mates with features (not shown) in base 20 to lock upper swivel body 30 in a retracted position or an operative position. Also extending through upper swivel body 30 is a plunger assembly 50 which is normally held in a upper position by a compression spring 52. When upper swivel body is in the operative position, plunger assembly 50 is located directly over a die assembly 60, and plunger assembly 50 is forced downward by an arbor press (not shown) to mount a metal hub plate 70 onto a hub member 80. Then a release lever 25 is depressed to eject the assembly of metal hub plate 70 and hub member 80 from the die assembly 60. An anti-rotation plate 32 mounted on upper swivel body 30 fixes plunger assembly 50 rotationally with respect to upper swivel body 30.

Figure 2A:
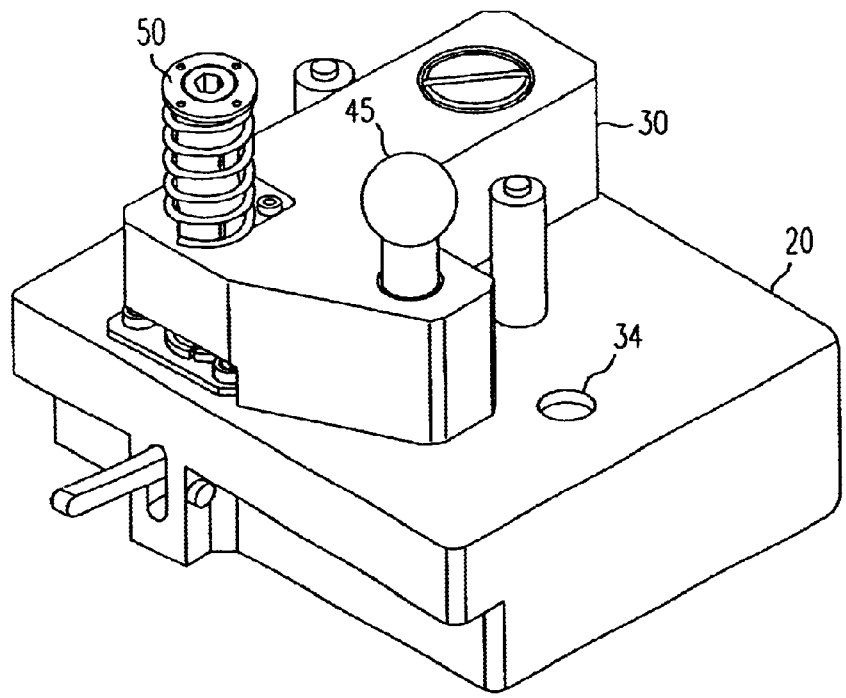
FIG. 2A is a view of the crimping tool in the operative position.
Figure 2B:
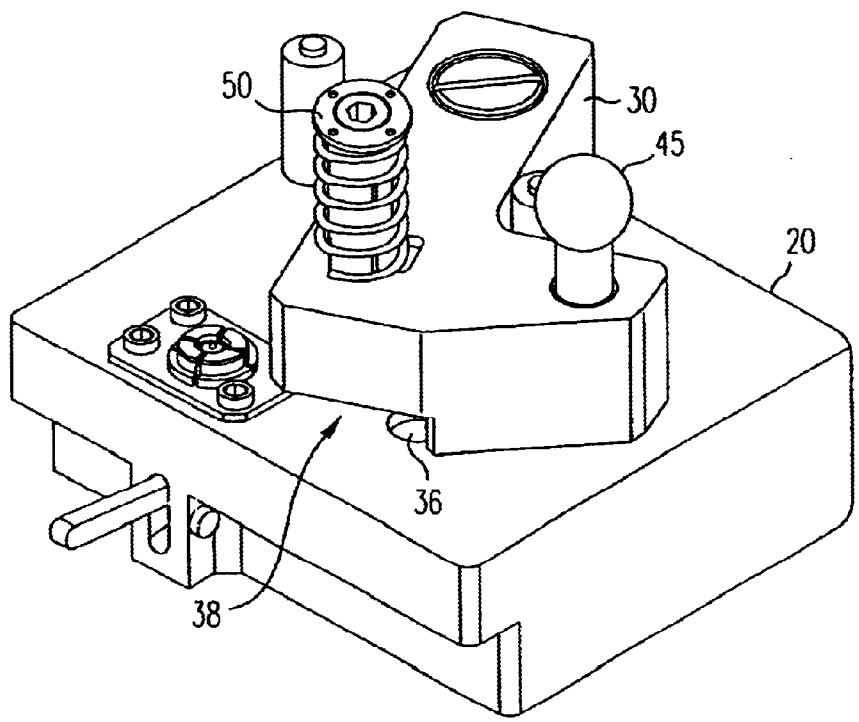
FIG. 2B is a view of the crimping tool in the retracted position.

FIG. 2A shows upper swivel body 30 in the operational position, and FIG. 2B shows upper swivel body 30 in the retracted position. The bottom end of locking pin 45 fits into a hole 36 (shown in FIG. 2B) when upper swivel body 30 is in the operational position, and into a hole 34 (shown in FIG. 2A) when upper swivel body 30 is in the retracted position. As shown, a cut-out area 38 of upper swivel body 30 provides clearance from die assembly 60 when upper swivel body 30 is in the operational position.

Figure 3:
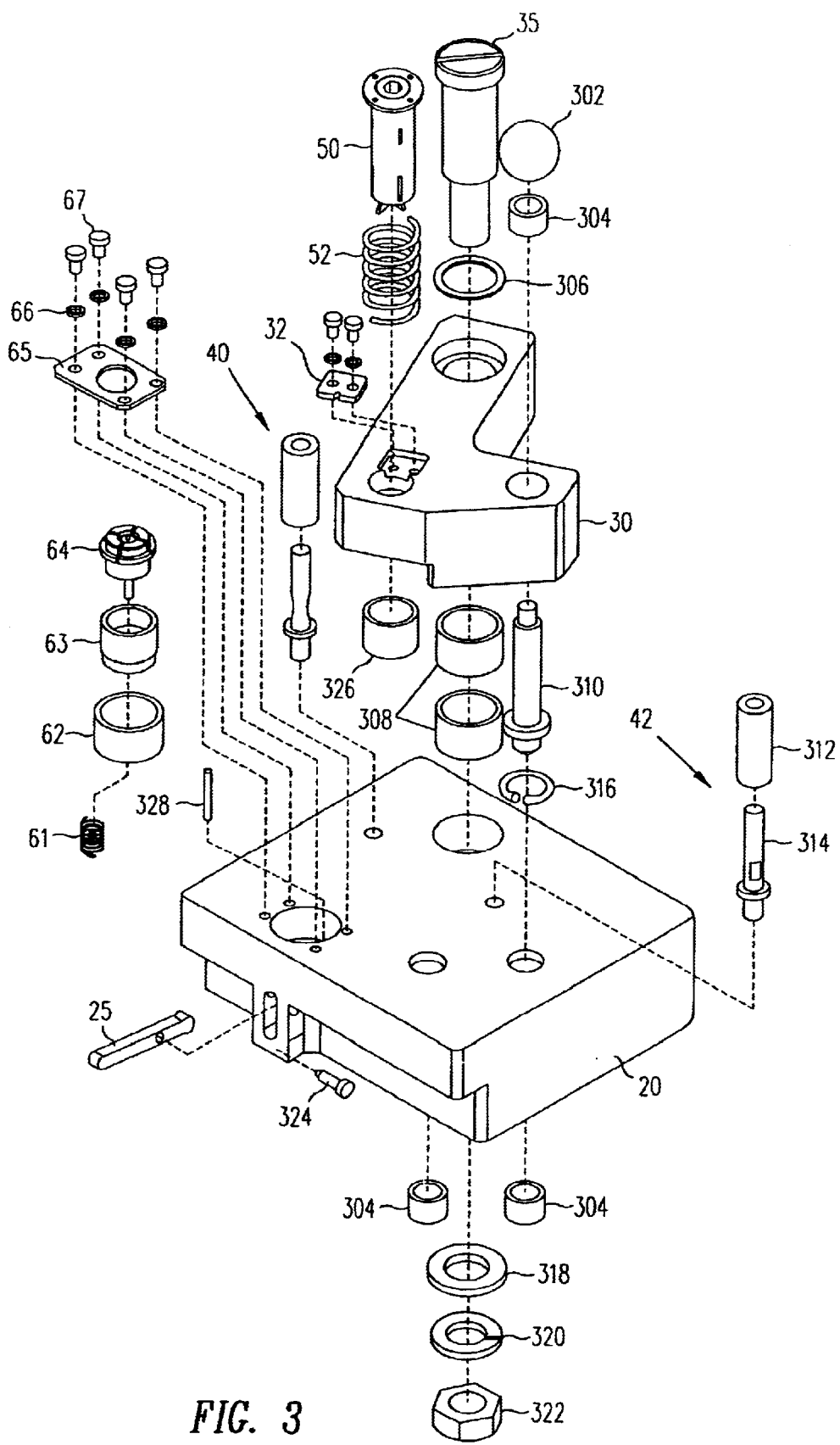
FIG. 3 is an exploded view of the crimping tool.
Figure 4:
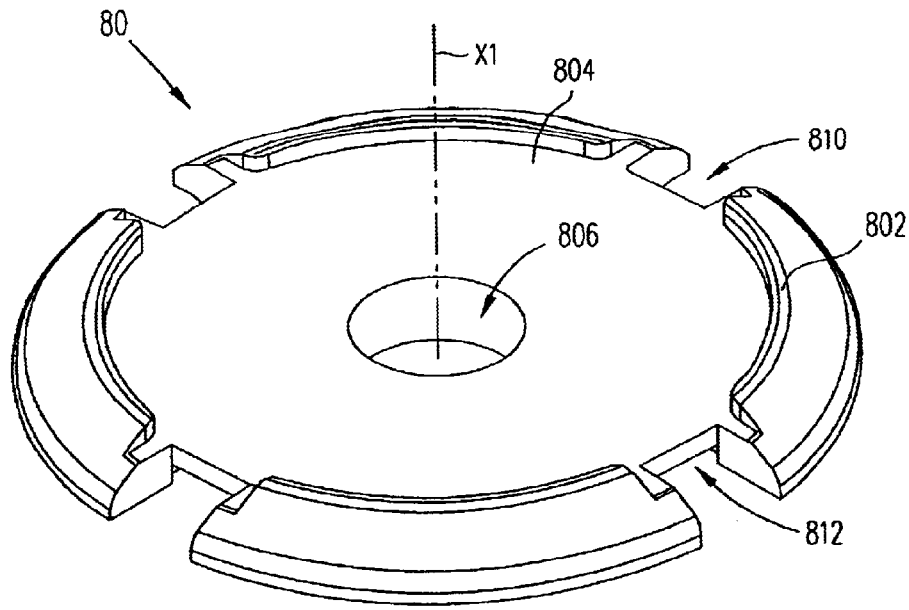
FIG. 4 is a perspective view of the hub member from the side on which the metal hub plate fits.

FIG. 3 shows an exploded view of crimping tool 10. The parts shown that are not described above are described in Table 1.

TABLE 1

| Reference Numeral | Description |
| --- | --- |
| 302 | 1-1/4-20 × 3/8 FI Davies ball knob |
| 304 | Sleeve bearing, 10.0 mm ID; 14.0 mm OD; 10.0 mm long |
| 306 | Delrin washer, 20.20 mm ID; 26.0 mm OD; 0.50 mm thick |
| 308 | Sleeve bearing, 20.0 mm ID; 25.0 mm; 16.0 mm long |
| 310 | Swivel locking pin |
| 312 | Tygon tube, ¼" ID; 1/8" wall; 1/2" OD |
| 314 | Swivel stop pin |
| 316 | Spring steel retaining ring, HSG diameter .750"; thickness .035"; clearance .64" |
| 318 | M16 flat washer, SST |
| 320 | M16 split lock washer, SST |
| 322 | M16 metric hex jam nut 18-8 SST |
| 324 | Large shoulder screw, SHSS M3 × 10 |
| 326 | Sleeve bearing, 16.0 mm ID; 20.0 mm; 16.0 mm long |
| 328 | Dowell pin, .093" OD; .875" long |
| 61 | Compression spring, .300" OD; .563 ID |
| 62 | Sleeve bearing, 20.0 mm ID; 25.0 mm; 16.0 mm long |
| 63 | Lower die spacer |
| 64 | Lower die assembly |
| 65 | Die retainer plate |
| 66 | M3 split lock washer, SST |
| 67 | Screw, SHCS M3 × 8 LG SST |

Figure 5:
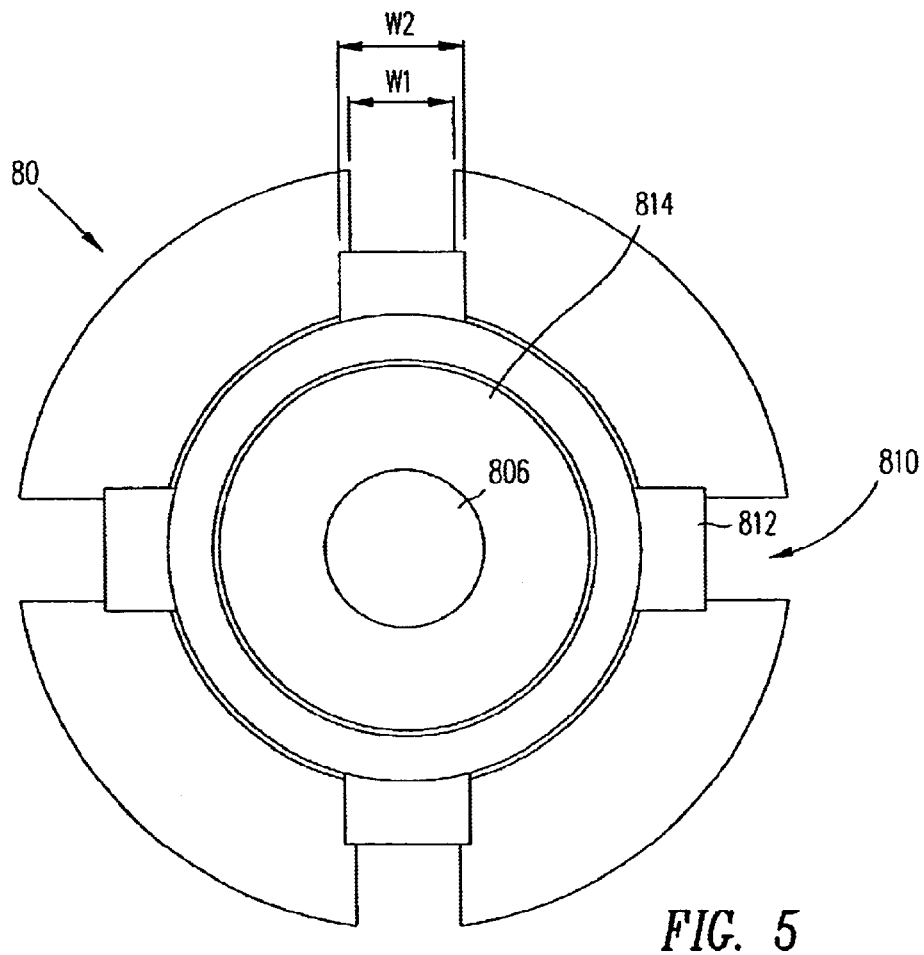
FIG. 5 is a plan view of the hub member from the side which is attached to a data storage disk.

FIGS. 4–8 illustrate an embodiment of hub member 80. Hub member 80 can be molded from polycarbonate, optical grade (O.G.) plastic, for example. The top side of hub member 80 contains a wall 802 which defines a circular recessed area 804 where the metal hub plate 70 fits. In one embodiment, circular recessed area 804 has a diameter (D1) of 6.08 mm, and the outside diameter (D2) of hub member 80 is 7.70 mm. A central hole 806 can be 1.60 mm in diameter, for example, and is formed about a central axis X1 of hub member 80. Four notches 810 are formed around the circumference of hub member 80 and, as shown in FIG. 5, on the underside of hub member 80 four recessed areas 812 are located radially inward from notches 810. The width (W1) of notches 810 can be 1.00 mm and the width of recessed areas (W2) can be 1.20 mm, for example. Notches 810 can be tapered so that they are slightly wider at the outer periphery of hub member 80 than where they adjoin recessed areas 812. In one embodiment, the difference in the width of notches 810 at these two locations is 0.02 mm.

On the underside of hub member 80 is a boss 814, which is a raised area that fits into a center hole of a data storage disk (not shown) to which hub member 80 is mounted. Preferably, hub member 80 and another similar hub are mounted on opposite sides of the disk, as shown in the above-referenced application Ser. No. 09/745,399, and therefore the height (H1) of boss 814 is approximately equal to one-half the thickness of the disk. In one embodiment H1 is equal to 0.287 mm. Surrounding boss 814 is an overflow channel 815 for holding the adhesive that is used to bond hub member 80 to a disk (not shown).

Figure 10:
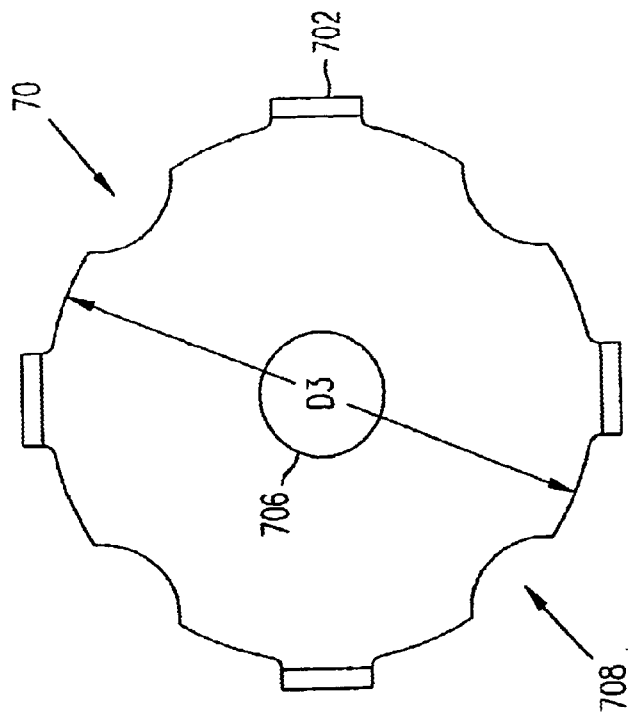
FIG. 10 is a plan view of the metal hub plate.
Figure 9:
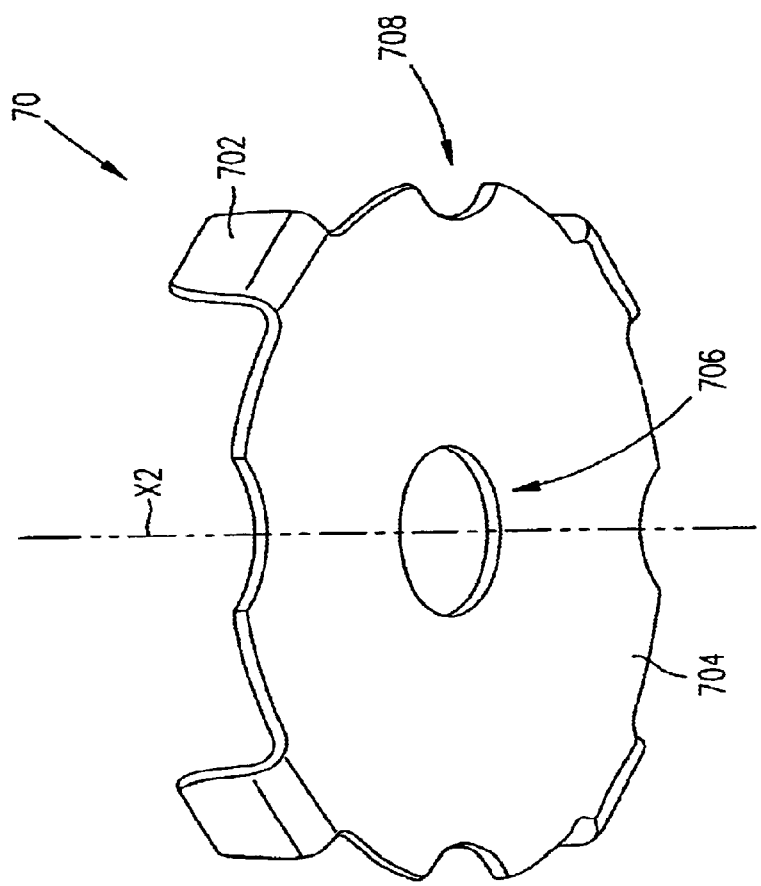
FIG. 9 is a perspective view of the metal hub plate.

FIGS. 9 and 10 are perspective and top views, respectively, of metal hub plate 70. Metal hub plate 70 can be made of AISI 430 SS-Soft, for example, and is preformed as shown, with tabs 702 bent 90 degrees from flat portion 704. The sheet metal may be 0.127 mm thick. Central hole 706 can be 1.425 mm in diameter. The diameter D3 of flat portion 704 can be 5.97 mm. Tabs 702 can be 1.060 mm long and 1.00 mm wide at their base and may taper to a width of 0.80 mm at their outer end. The metal may be finished with Type VIII nitric acid passivation. Four notches 708 are formed at the perimeter of the flat portion 704. Metal hub plates preformed as shown in FIGS. 9 and 10 are available from Belton Industrial Ltd. of Hong Kong. Metal hub plate 70 has a central axis X2.

Figure 11:
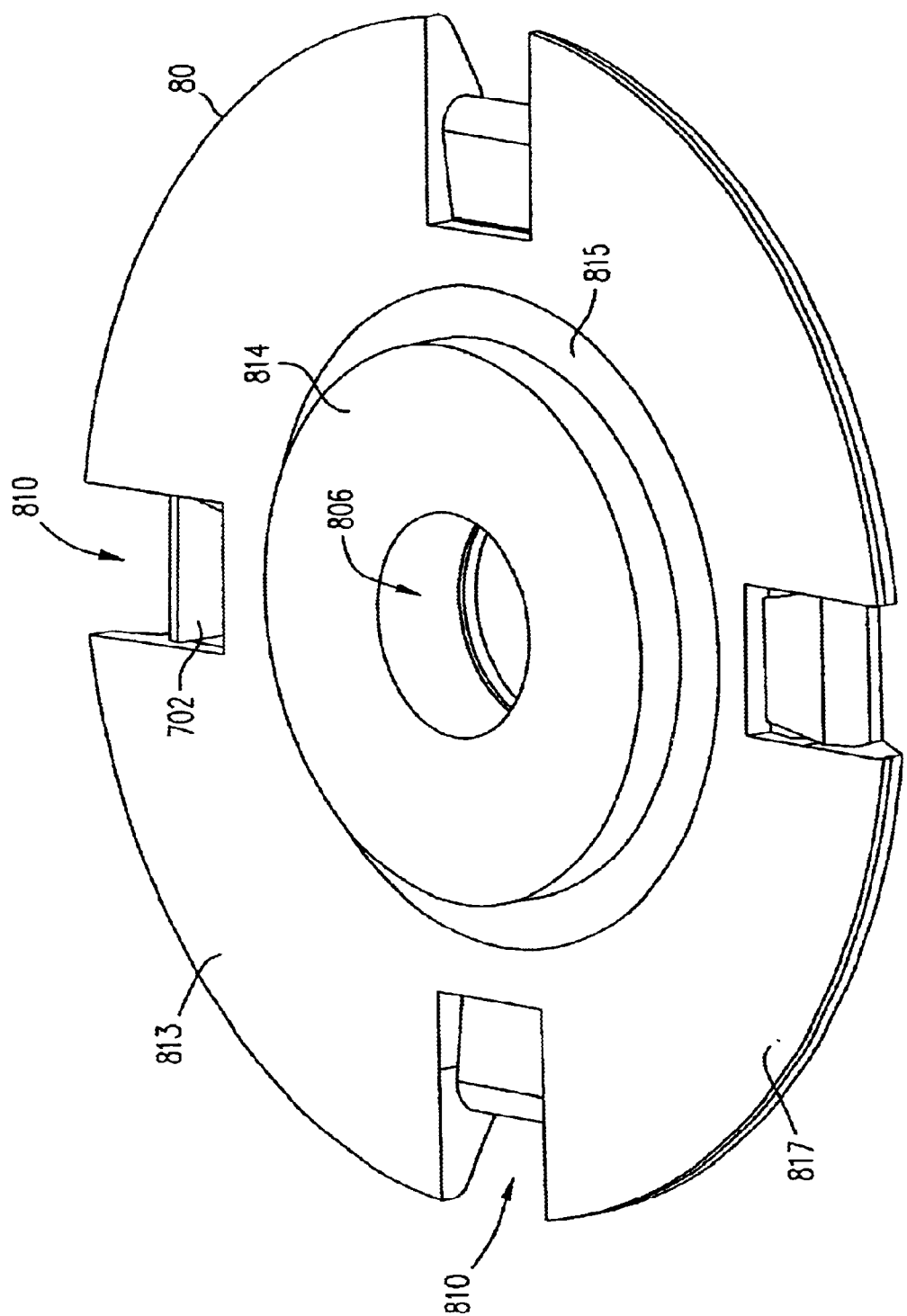
FIG. 11 is a perspective view of the completed hub assembly, showing how the tabs of the metal hub plate fit into the notches of the hub member.

FIG. 11 is a perspective view of the completed assembly of metal hub plate 70 and hub member 80, showing how tabs 702 fit into notches 810. Also shown is a surface 817 to which an adhesive is applied to bond hub member 80 to a disk (not shown).

Figure 12:
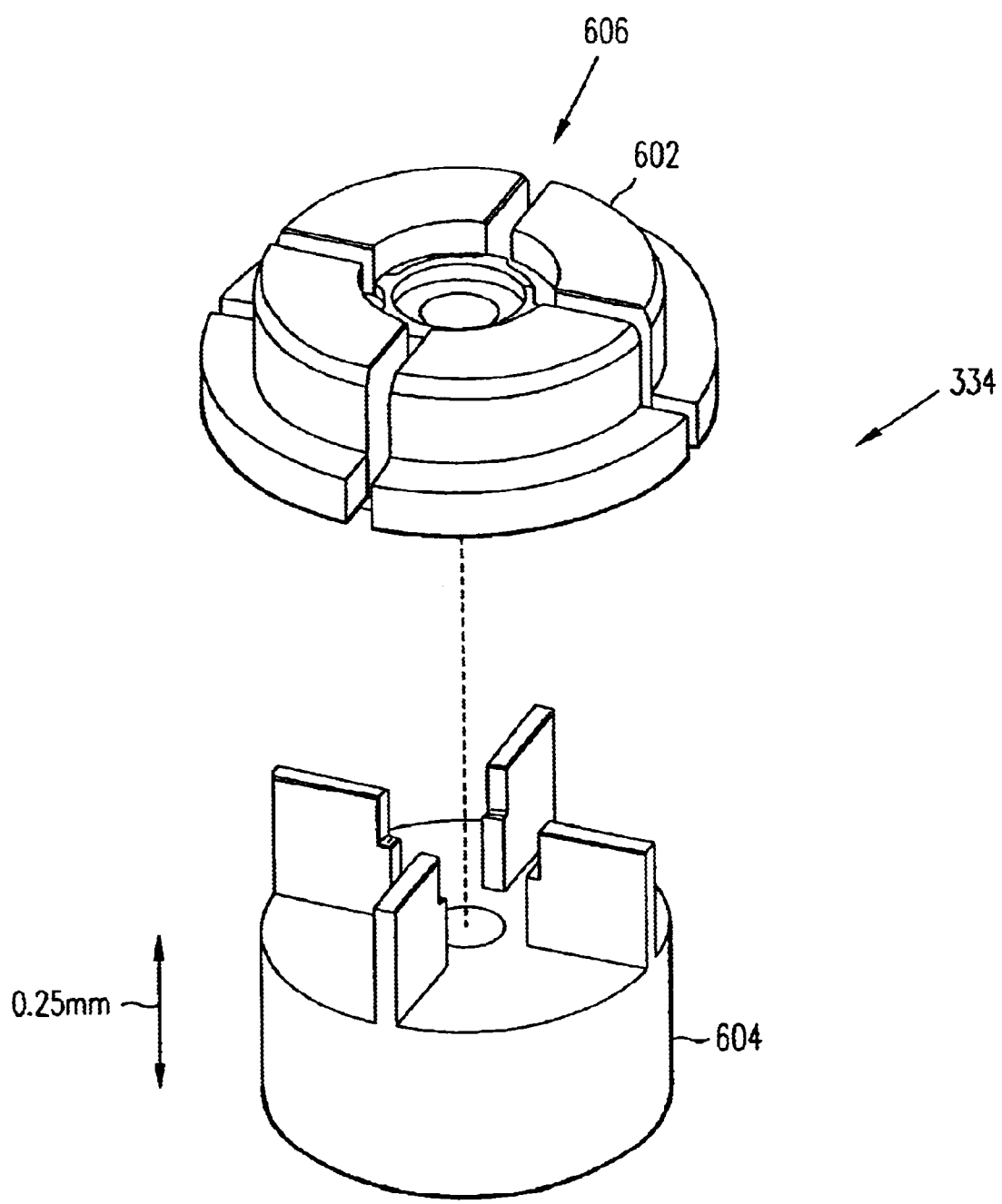
FIG. 12 is an exploded view of the lower die assembly, showing the formed hub nest lower die and the hub plate forming lower die.
Figure 13A:
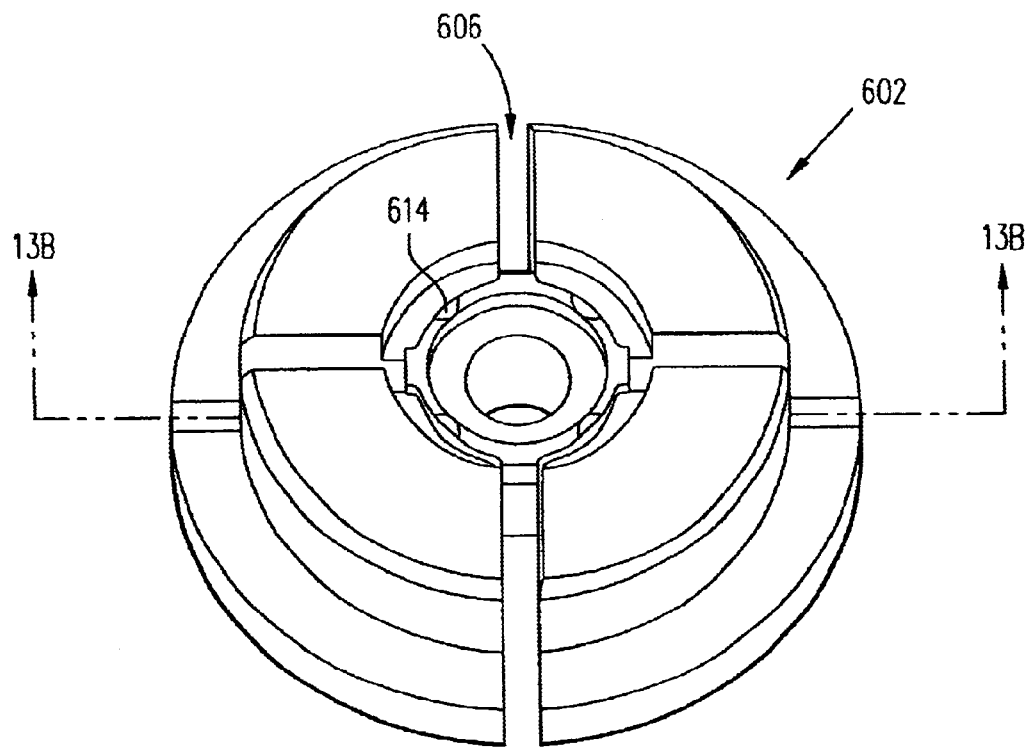
FIG. 13A is a perspective view of the formed hub nest lower die.
Figure 13B:
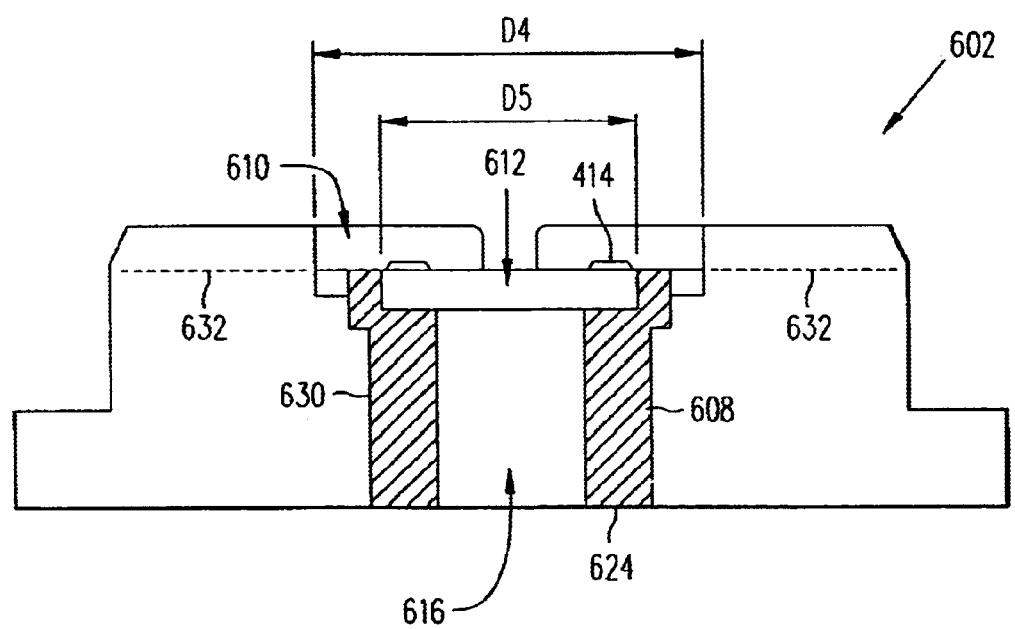
FIG. 13B is a cross-sectional view of the formed hub nest lower die taken at section 13B—13B shown in FIG. 13A.
Figure 14:
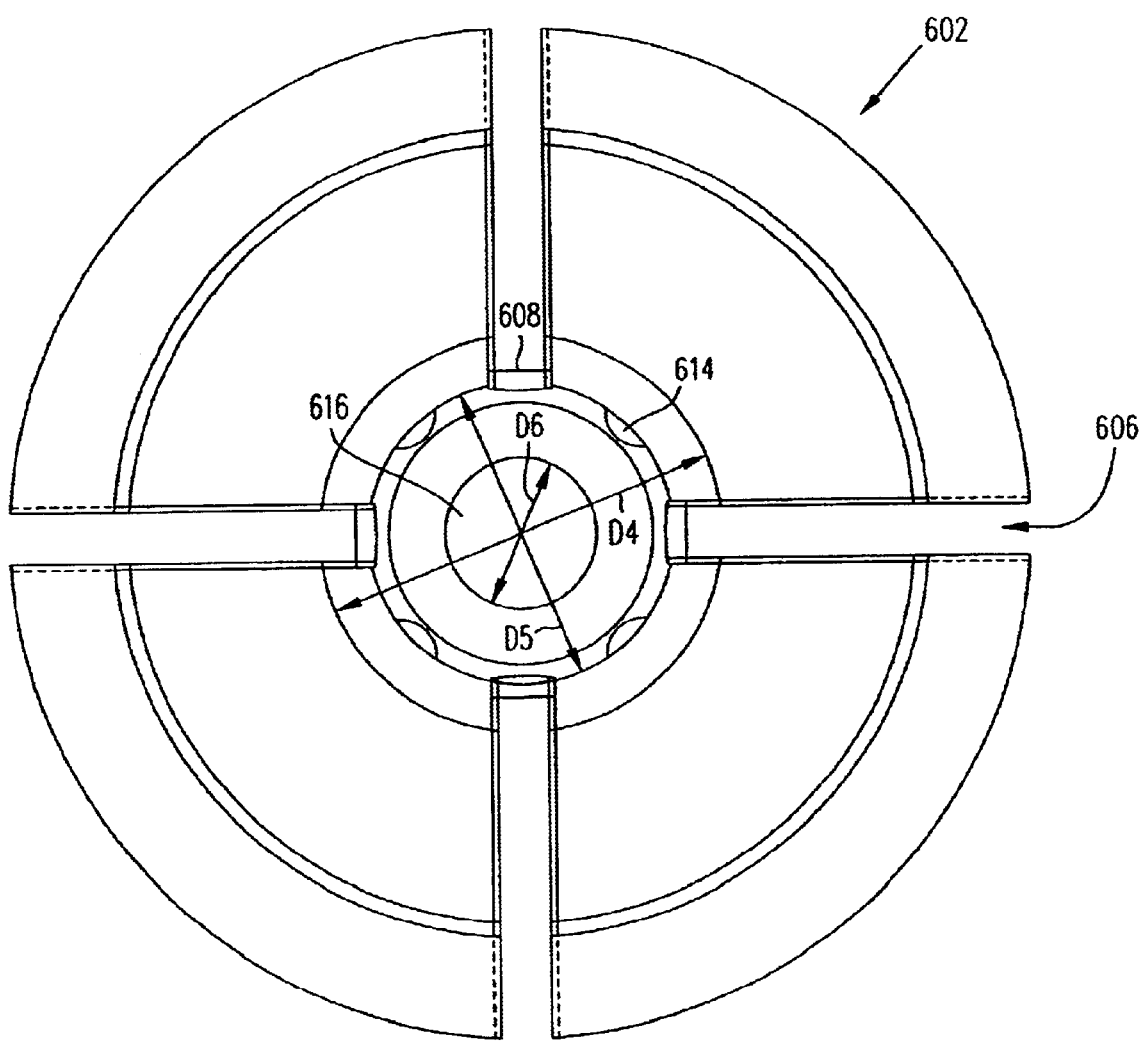
FIG. 14 is a plan view of the formed hub nest lower die.

As shown in FIG. 12, lower die assembly 64 includes a formed hub nest lower die 602, which fits into a hub plate forming lower die 604. FIG. 13A is a more detailed view of hub formed hub nest lower die 602, FIG. 13B is a cross-sectional view taken at line 13—13 in FIG. 13A, and FIG. 14 is a detailed top view of formed hub nest lower die 602. Formed hub nest lower die 602 includes four radial slots 606 formed at right angles to each other that extend radially inward and terminate at a central cylindrical region 608. The upper part of formed hub nest lower die 602 includes two concentric cavities, an upper cavity 610 with a diameter (D4) of 7.9 mm, and a lower cavity 612 with a diameter (D5) of 5.96 mm. Four arcuate nubs 614 project inward at a level near the bottom of upper cavity 606. Nubs 610 are shaped to fit into the notches 708 of metal hub plate 70. A central hole 616 extends through the center of formed hub nest lower die 602. The diameter (D6) of hole 616 is 3.00 mm.

Figure 15:
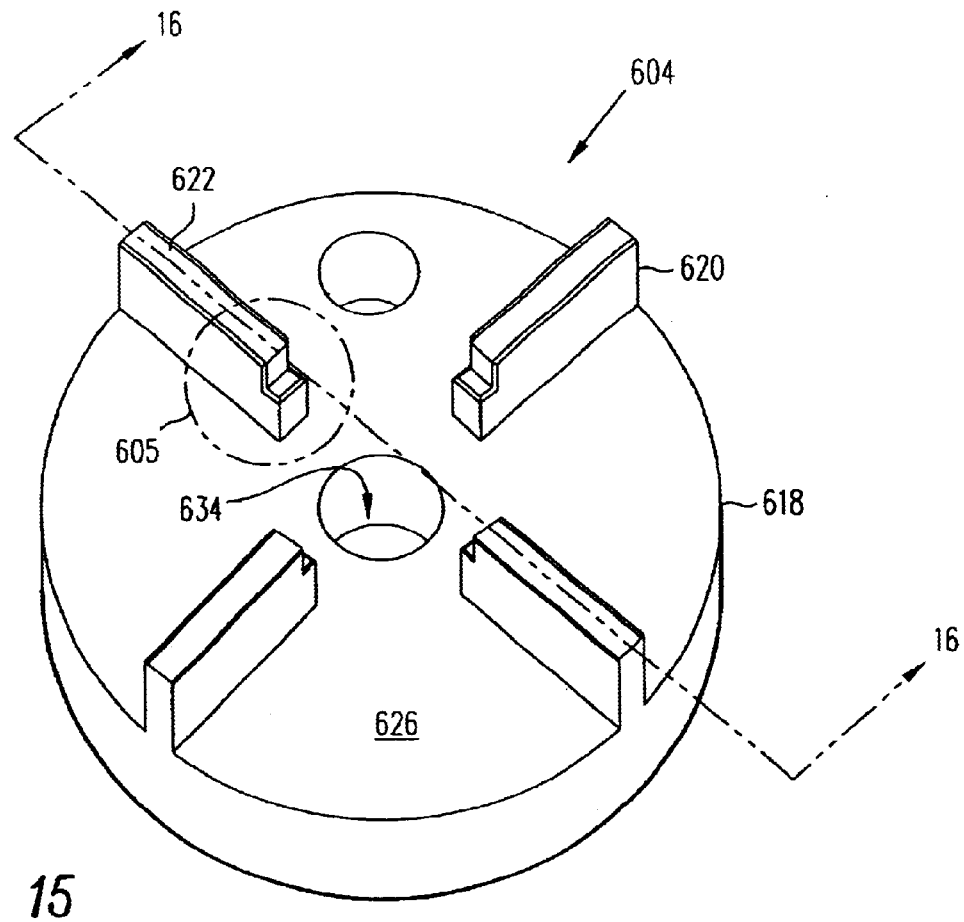
FIG. 15 is a perspective view of the hub plate forming lower die.
Figure 16:
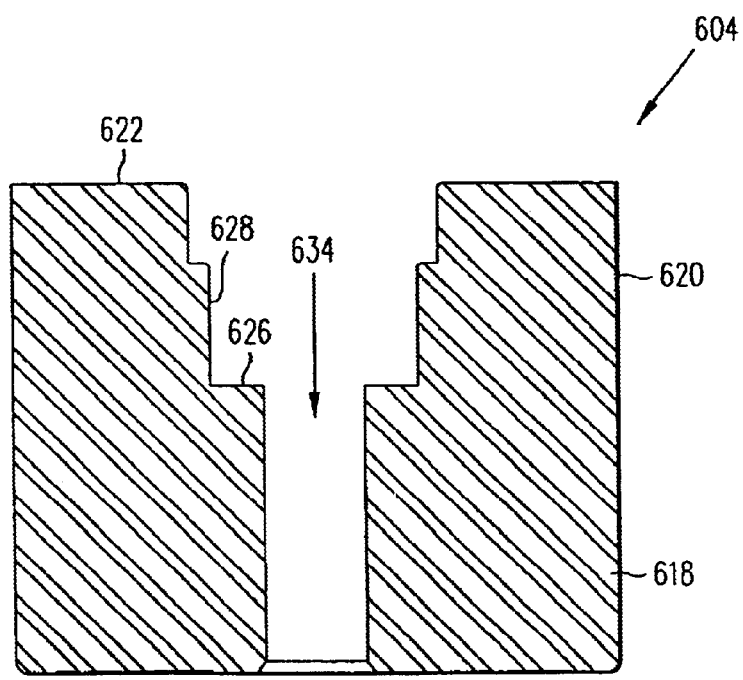
FIG. 16 is a cross-sectional view of the hub plate forming lower die taken at section 16—16
Figure 17:
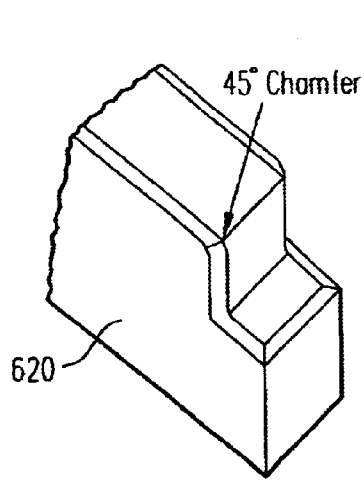
FIG. 17 is a detailed view of one of the fins in the hub plate forming lower die.

Hub plate forming lower die 604 is shown in FIGS. 15–17. Hub plate forming lower die 604 includes a base 618 and four upward extending fins 620. The top surface 622 of each of fins 620 is a sliding surface that contacts a corresponding sliding surface of plunger 50, as described below. As shown in FIG. 17, which is a detailed view of region 605 shown in FIG. 15, the upper edges of fins 620 are chamfered at a 45 degree angle to make hub plate forming lower die 604 easier to assemble with formed hub nest lower die 602.

Figure 18:
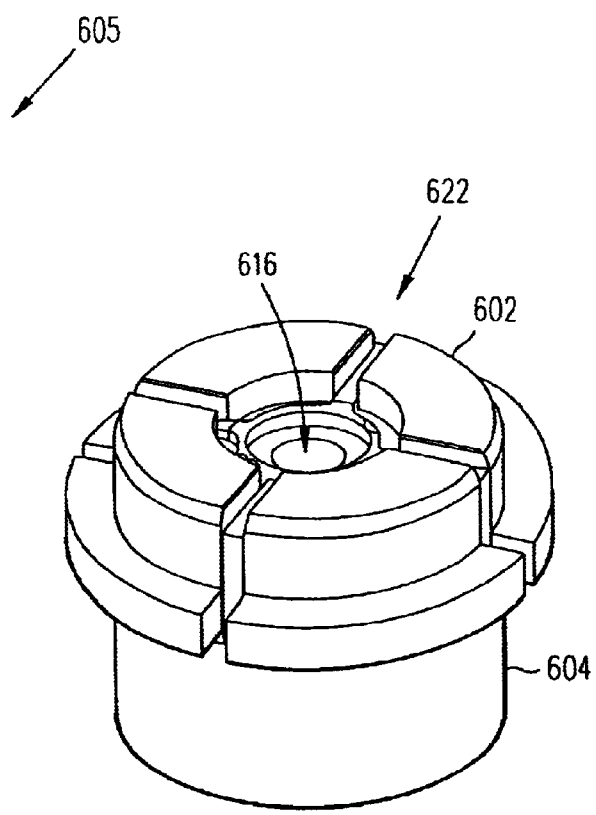
FIG. 18 is a perspective view of the formed hub nest lower die without the hub plate ejection pin.

As shown in FIG. 18, formed hub nest lower die 602 and hub plate forming lower die 604 fit together to form lower die assembly 64. Fins 620 fit into slots 606, and a lower surface 624 of central cylindrical region 608 of formed hub nest lower die 602 rests on an upper surface 626 of base 618 (see FIGS. 13B, 15, and 16). In one embodiment, fins 620 are 0.913 mm thick and slots 606 are 1.04 mm wide, yielding a clearance of 0.127 mm between fins 620 and slats 606. An inner surface 628 of each of fins 620 mates with an outer surface 630 of central cylindrical region 608. Dashed lines 632 in FIG. 13B indicate the location of the top surfaces 622 of fins 620 when formed hub nest lower die 602 and hub plate forming lower die 604 are assembled together.

Figure 19:
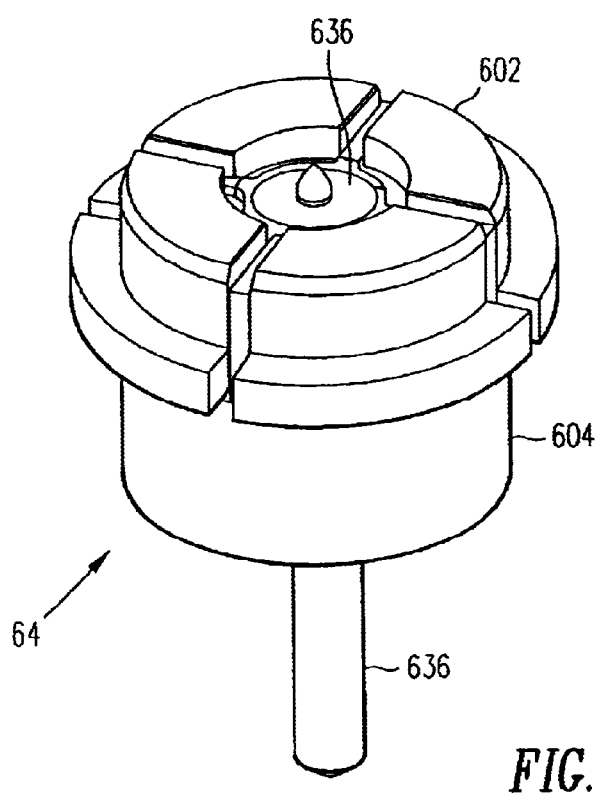
FIG. 19 is a perspective view of the formed hub nest lower die with the hub plate ejection pin.

When formed hub nest lower die 602 and hub plate forming lower die 604 are assembled, central hole 616 of formed hub nest lower die 602 is aligned with a central hole 634 of hub plate forming lower die 604. As shown in FIG. 19, a hub ejection pin 636 is inserted through central holes 616 and 634 to form lower die assembly 334.

Figure 20:
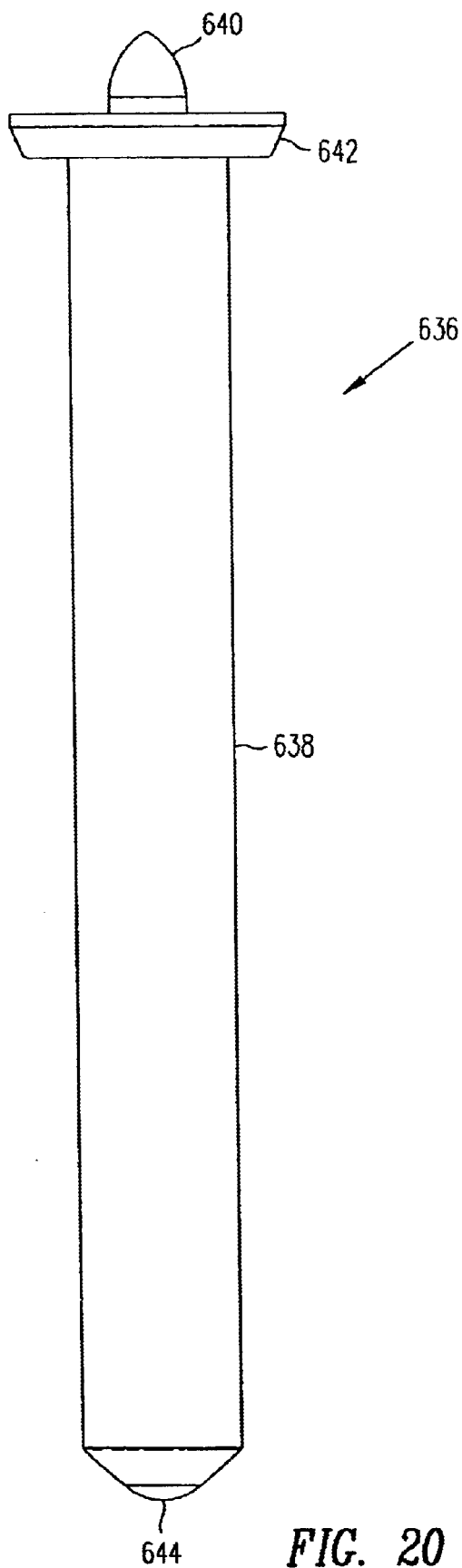
FIG. 20 is a view of the hub plate ejection pin.

Hub ejection pin 636 is shown in FIG. 20. Hub ejection pin 636 includes a shank 638, a nose 640, a disk 642 and a heel 644. When hub ejection pin 636 is assembled with formed hub nest lower die 602 and hub plate forming lower die 604, disk 662 is positioned within lower cavity 612 of formed hub nest lower die 602 (see FIG. 13B). As described further below, when hub ejection pin 636 is pushed upward through formed hub nest lower die 602 and hub plate forming lower die 604, nose 660 projects into the central hole 706 of metal hub plate 70, and the upward motion of hub ejection pin 636 ejects the crimped assembly of metal hub plate 70 and hub member 80 from die assembly 60 (see FIG. 21).

Figure 21:
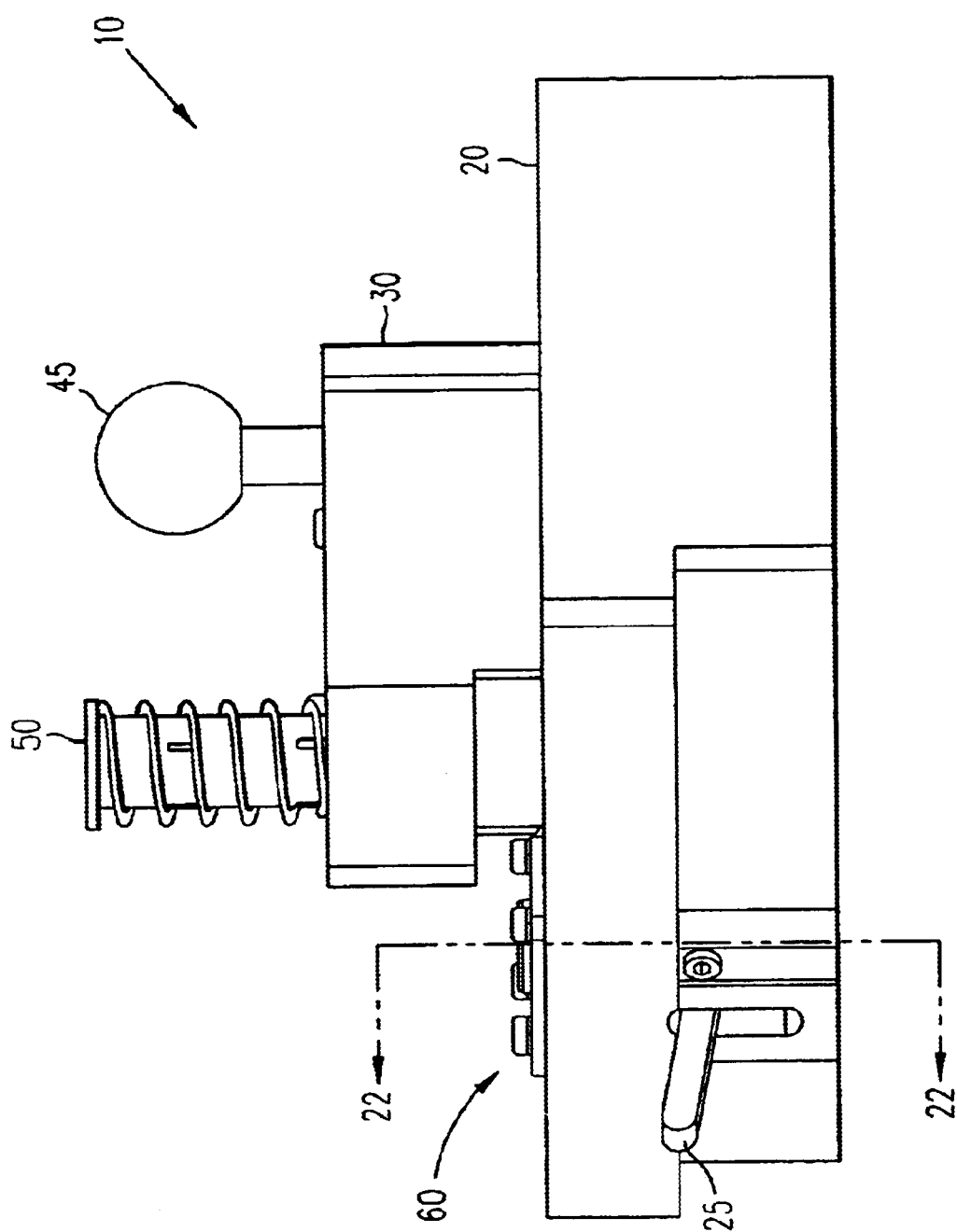
FIG. 21 is an elevation view of the crimping tool.
Figure 22:
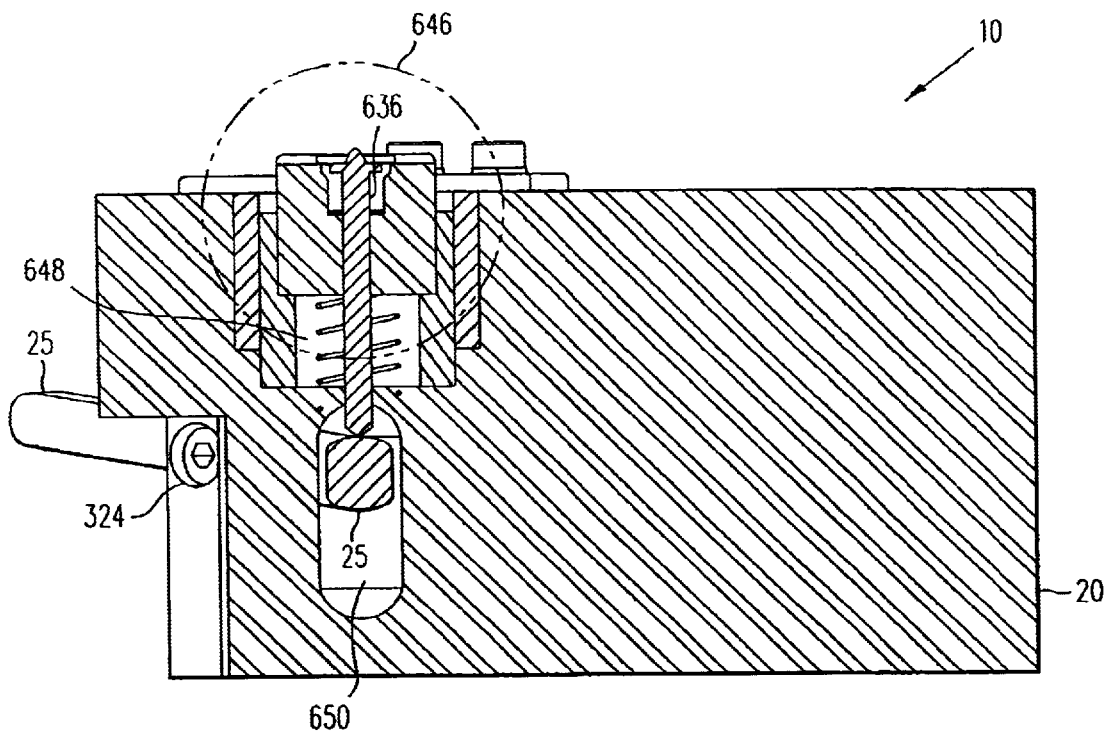
FIG. 22 is a cross-sectional view of the base showing the position of the formed hub nest lower die and hub plate ejection mechanism.
Figure 23:
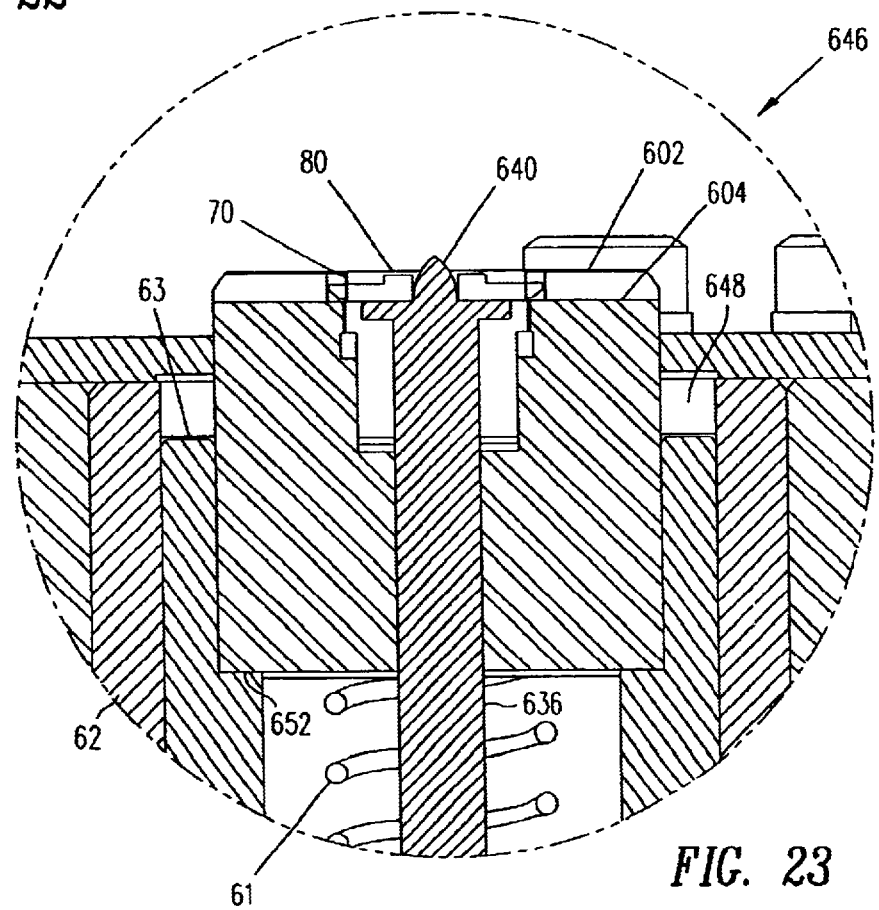
FIG. 23 is a detailed cross-sectional view of the formed hub nest lower die.

FIGS. 22 and 23 illustrate the structure within base 20 that causes the crimped assembly of metal hub plate 70 and hub member 80 to be ejected from die assembly 60 when release lever 25 is depressed. FIG. 22 is a cross-sectional view taken at section 23—23 shown in FIG. 21, and FIG. 23 is a detailed view of area 646 shown in FIG. 22. An upper cavity 648 and a lower cavity 650 are formed in base 20. Compression spring 61, sleeve bearing 62, lower die spacer 63, and lower die assembly 64 are housed in the upper cavity 648, with the lower end of hub ejection pin 636 projecting through a vertical hole connecting cavities 648 and 650 and into lower cavity 650. The end of release lever 25 also extends into lower cavity 650 and contacts the heel 644 of hub ejection pin 636. Since release lever 25 pivots about shoulder screw 324, when the exterior end of release lever 25 is pressed downward, the end of release lever 25 in cavity 650 forces hub ejection pin 636 upward, ejecting the crimped assembly of metal hub plate 70 and hub member 80 from die assembly 60.

Compression spring 61 rests on the bottom surface of cavity 648 and is sized such that it lifts hub plate forming lower die 604 about 0.25 mm above an interior shelf 652 of lower die spacer 63 when no downward force is applied to lower die assembly 64. This counters the spring action and force created by the plunger 50 while allowing for some variation in the thickness of metal hub plate 70.

Figure 24:
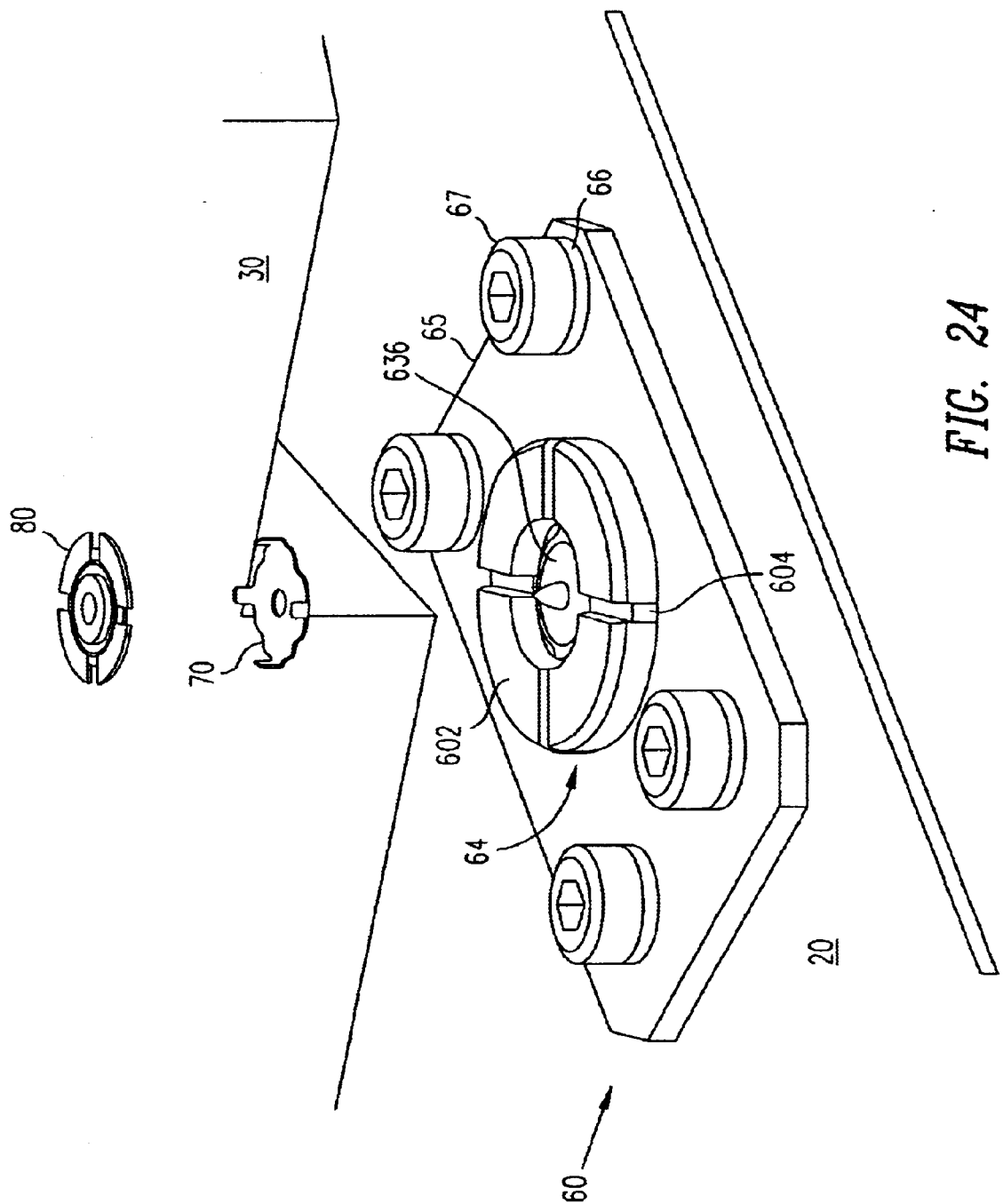
FIG. 24 is a detailed perspective view of the die assembly.

FIG. 24 is a detailed view of die assembly 60, showing how metal hub plate 70 and hub member 80 are positioned in relation to each other and to die assembly 60. When metal hub 25 plate 70 is placed into lower die assembly 64, the nubs 614 of formed hub nest lower die 602 (see FIG. 14) fit into the notches 708 in metal hub plate 70, thereby aligning metal hub plate 70 rotationally with lower die assembly 64. Doing this also aligns the tabs 702 of metal hub plate 70 with the slots 606 of formed hub nest lower die 602. The nose 640 of hub ejection pin 636 also fits into the central hole 616 of metal hub plate 70, properly centering metal hub plate 70. Hub member 80 is then placed on top of metal hub plate 70, with tabs 702 protruding upward into notches 810 of hub member 80.

Plunger assembly 50 is then forced downward against the force of compression spring 52, preferably using an arbor press, and tabs 702 are bent in and around the four slots 606 so that, when the process is finished, the ends of tabs 702 are positioned entirely in the recessed areas 812 of hub member 80. The entirety of tabs 702 should be positioned in recessed areas 812, so that surface 813 (see FIG. 7) of hub member 80 can be pressed flat against the surface of a data storage disk without interference from tabs 702.

Figure 25:
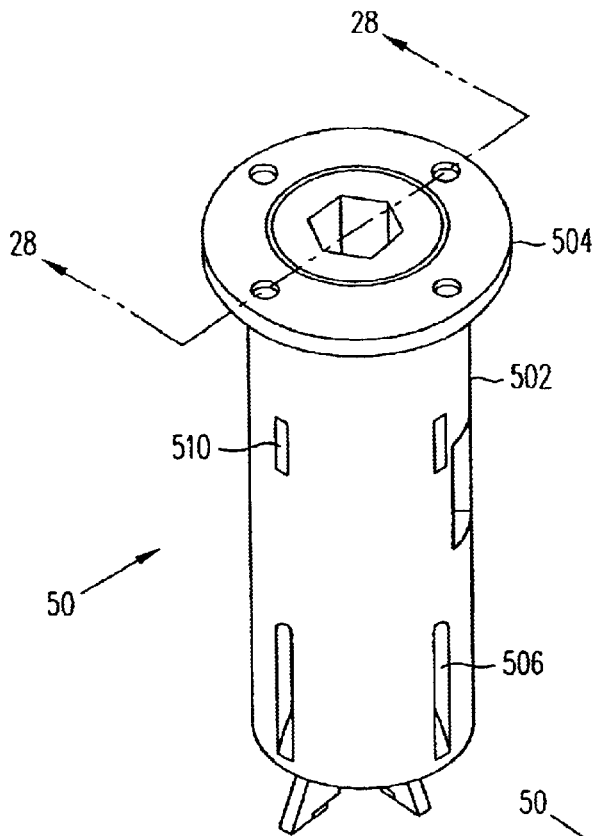
FIG. 25 is a perspective view from above the plunger assembly.
Figure 26:
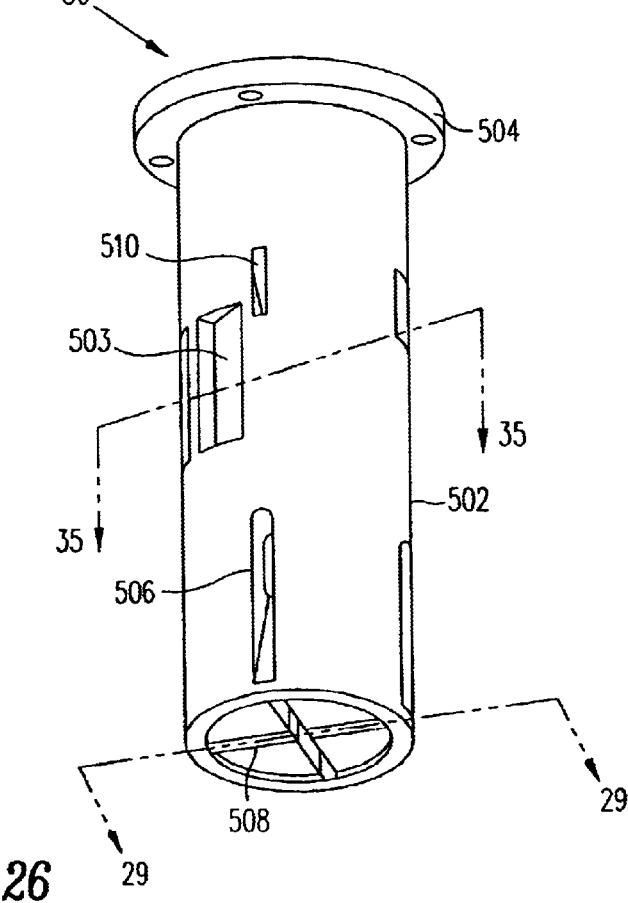
FIG. 26 is a perspective view from below the plunger assembly.
Figure 27:
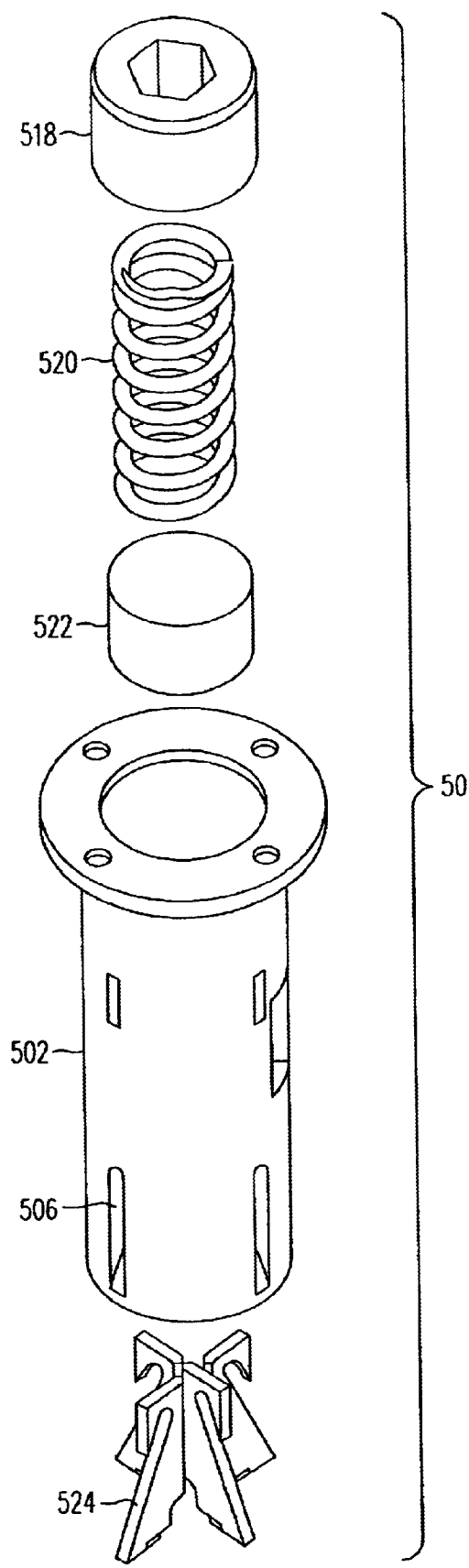
FIG. 27 is an exploded view of the plunger assembly.
Figure 28:
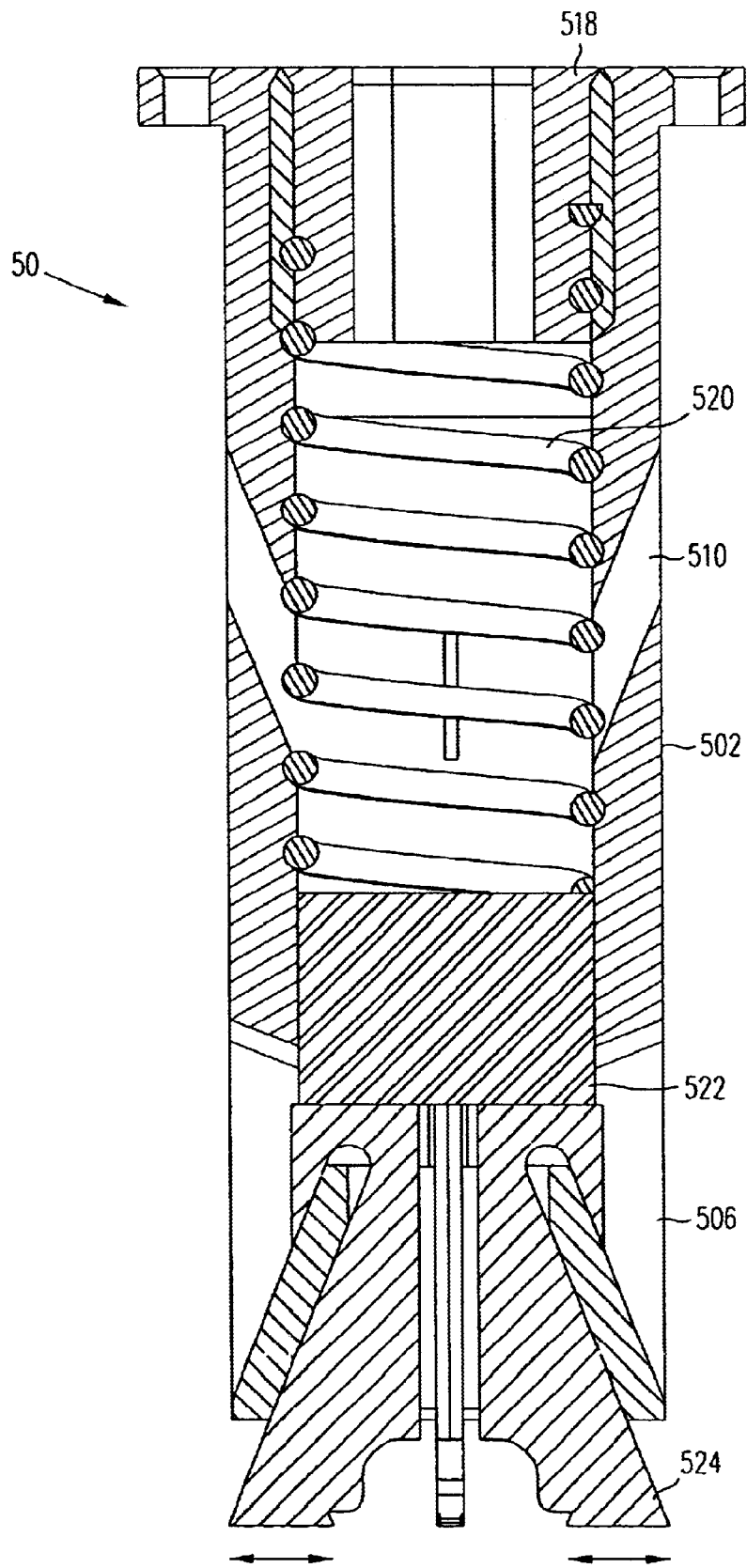
FIG. 28 is a cross-sectional view of the plunger assembly taken at section 28—28 shown in FIG. 25.
Figure 29:
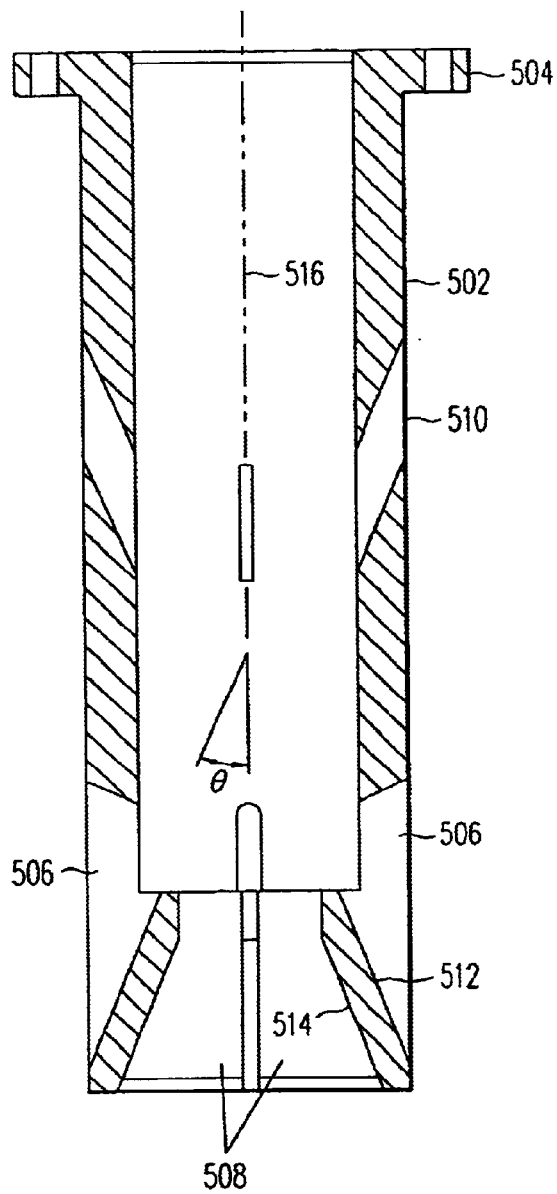
FIG. 29 is a cross-sectional view of the plunger body taken at section 29—29 shown in FIG. 26.
Figure 30:
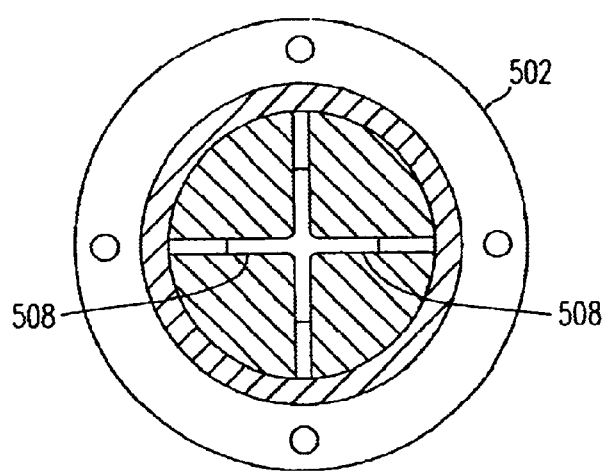
FIG. 30 is a plan view of the plunger assembly from below.

FIGS. 25–35 show various views of plunger assembly 50. FIGS. 25 and 26 are perspective views taken from above and below plunger assembly 50, respectively, showing a generally tubular body 502 having a flange 504 at the top. In one embodiment, body 502 is 16.016 mm in diameter and 50.00 mm long and slides vertically in a hole 16.40 mm in diameter through sleeve bearing 326 in upper swivel body 30. Four slots 506 are formed at 90 degree intervals around the circumference of body 502, and slots 506 are aligned with slots 508 at the bottom of body 502. As shown in FIG. 29, which is a view taken at cross-section 29—29 shown in FIG. 26, body member 502 is actually closed at the bottom, and slots 506 and 508 are cut in body 502, preferably using an EDM electrode, available from EDM Wire and EDM Pocket. In the embodiment shown, slots 510 are formed as a concomitant of using the EDM wire to cut slots 508 and are not functional. As shown in FIG. 29, slots 506 are bounded by a sliding surface 512, and slots 508 are bounded by a sliding surface 514, both of which are cut at an angle θ to the central axis 516 of body 502. In one embodiment, θ is equal to 22 degrees, but θ is preferably in a range of from 21.5 degrees to 22.5 degrees.

FIG. 27 shows an exploded view of plunger assembly 50, including a ½"-20 socket hollow chrome screw 518, a compression spring 520, a pressure pad 522, and four crimping jaws 524. As shown FIG. 28, taken at cross-section 28—28 in FIG. 25, crimping jaws 524 fit into slots 506 and 508.

Figure 31:
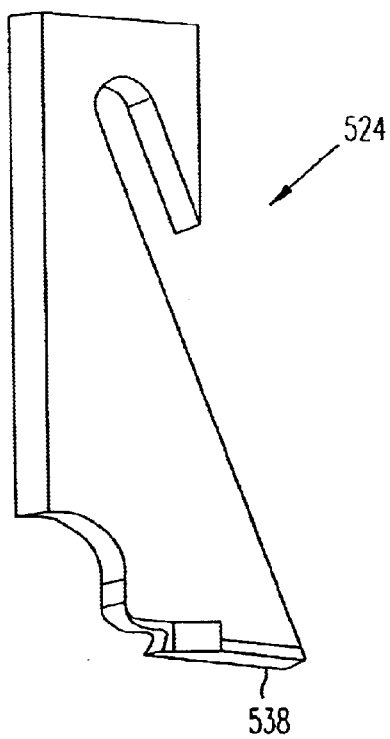
FIG. 31 is a perspective view of one of the crimping jaws.
Figure 32:
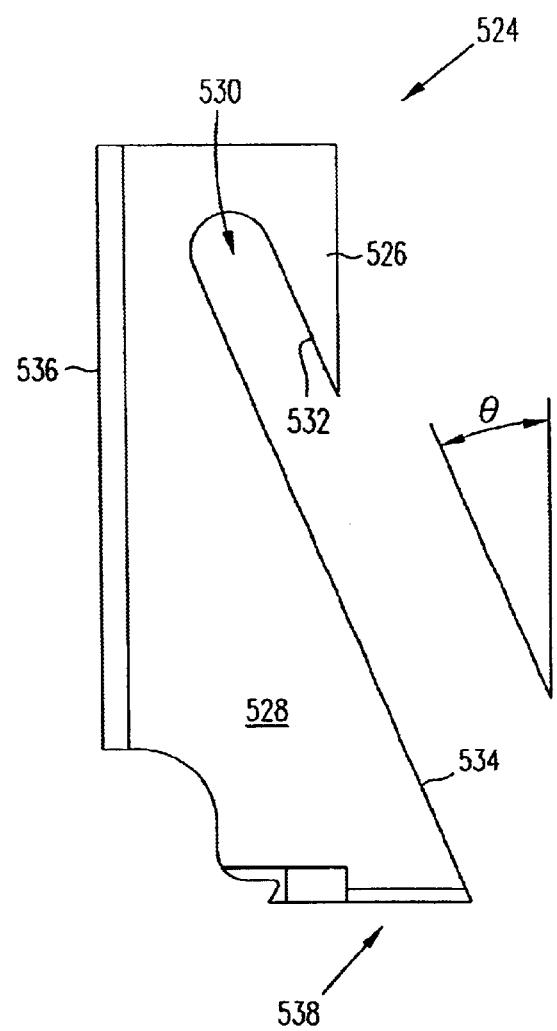
FIG. 32 is a side view of the crimping jaw.

One of crimping jaws 524 is shown in perspective in FIG. 31 and in side view in FIG. 32. As shown in FIG. 32, each crimping jaw 524 includes an upper portion 526 and a lower portion 528, separated by a slot 530. When crimping jaw 524 is inserted in body 502, the upper portion 526 extends into one of slots 506 and the lower portion extends downward into one of slots 508.

Figure 34:
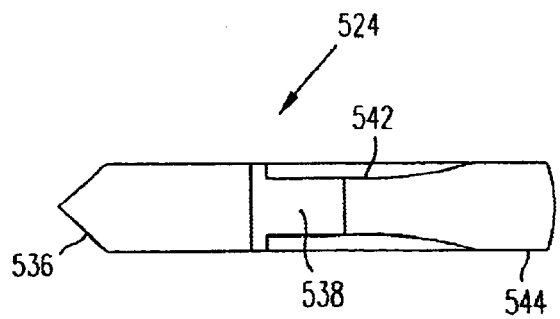
FIG. 34 is a view of the crimping jaw from below.

Slot 530 is bounded above by an upper sliding surface 532 and below by a lower sliding surface 534. Sliding surfaces 532 and 534 are slanted at the angle θ to the edge 536 of crimping jaw 524. As shown in FIG. 34, which is a view of crimping jaw 524 from below, the edge 536 has two surfaces mitered at 45-degree angles. As described below, during the crimping process the four mitered edges 536 meet to stop the inward radial movement of crimping jaws 524.

Figure 33:
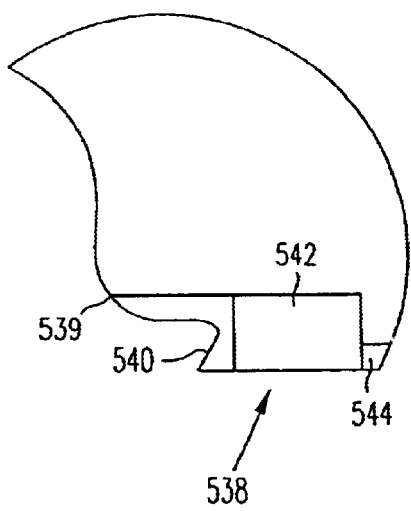
FIG. 33 is a detailed view of the lower portion of the crimping jaw.

FIGS. 33 and 34 show the details of the lower portion of crimping jaw 524. A bottom surface 538 contains a prow 540, which is angled at 60 degrees to the horizontal, and recessed surfaces 542, the trailing portions of which are arc-shaped. Beyond the recessed surfaces 542 the bottom surfaces 538 of crimping jaw 524 are chamfered as indicated at 544 in FIG. 33. Also shown is a cam surface 539, which in this embodiment has an arcuate shape.

When plunger assembly 50 is assembled, as shown in FIG. 28, compression spring 520 urges pressure pad 522 downward. Pressure pad 522 in turn exerts a downward force on each of crimping jaws 524, so that the portion of body 502 between slots 506 and 508 is forced as far as possible into the slot 530 of the crimping jaw 524. As plunger assembly 50 is forced downward, preferably by an arbor press, crimping jaws 524 remain in this position until the bottom surfaces 538 contact the top surfaces 622 of fins 620 in lower die assembly 64 (see FIGS. 15 and 16).

Figure 35:
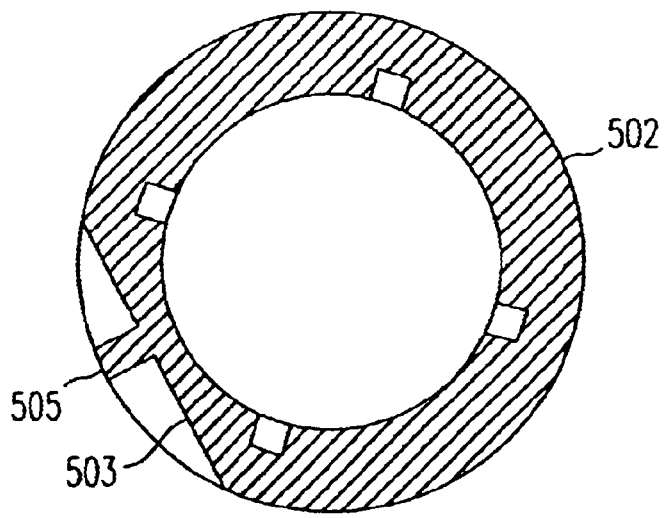
FIG. 35 is a cross-sectional view of the plunger body taken at section 35—35 shown in FIG. 26.
Figure 36:
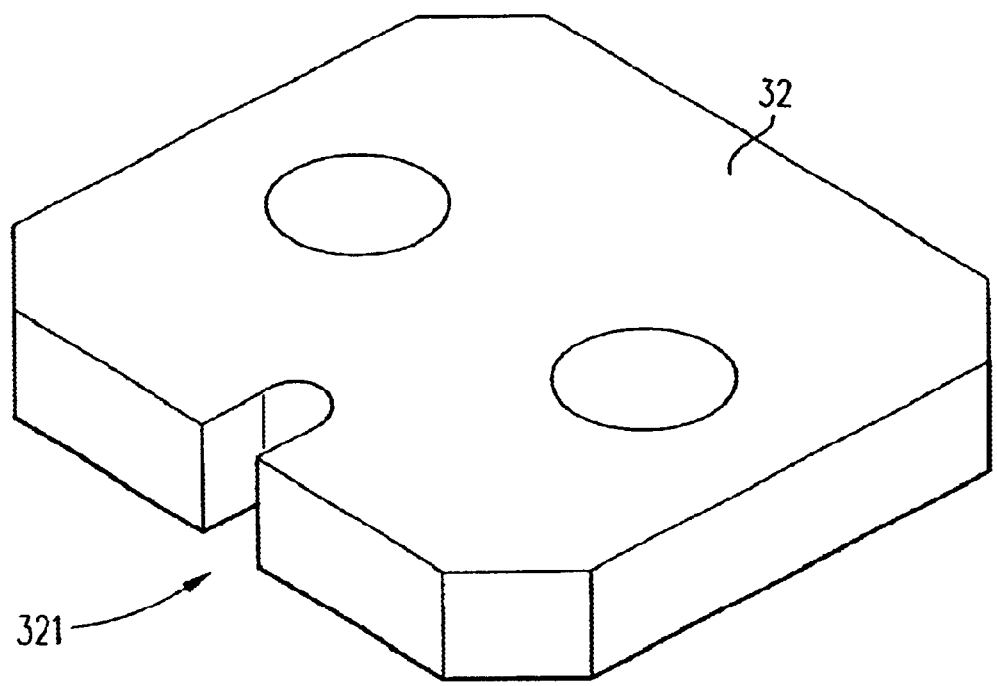
FIG. 36 is a perspective view of the anti-rotation plate.

FIG. 35 is a cross-sectional view of tubular body 502 taken at 35—35 shown in FIG. 26 and shows in particular a flat surface 503 and a ridge 505. Ridge 505 mates with a notch 321 that is formed in anti-rotation plate 32, shown in FIG. 36, to prevent any rotational movement of plunger assembly 50 as it slides up and down in upper swivel body 30.

FIGS. 37A–37E illustrate the action of crimping jaws 524 against tabs 702 of metal hub plate 70. Metal hub plate 70 is shown in cross-section, resting on the disk 642 of hub ejection pin 636. Fins 620 of lower die assembly 64 are also shown. For clarity, certain components are omitted from FIGS. 37A–37E, including body 502, formed hub nest lower die 602 and hub member 80.

Figure 37A:
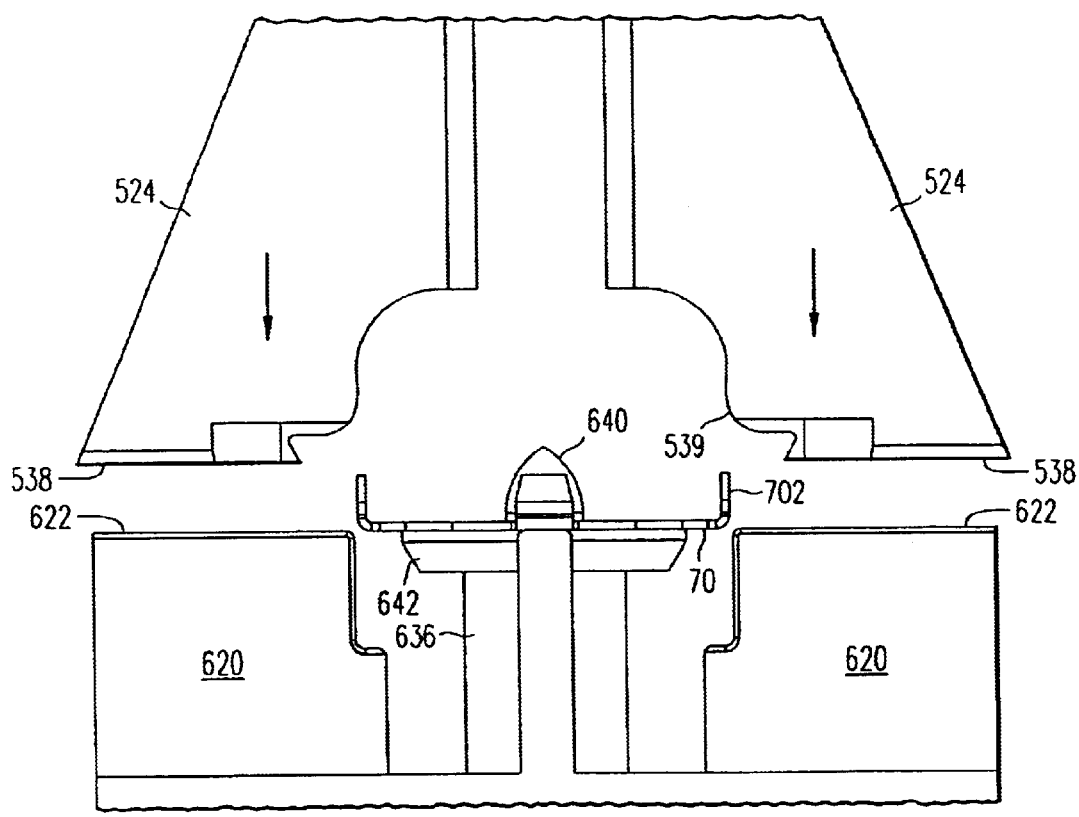
FIGS. 37A–37E is a sequence of showing the interaction of the crimping jaws and the tabs of the metal hub plate.
Figure 37B:
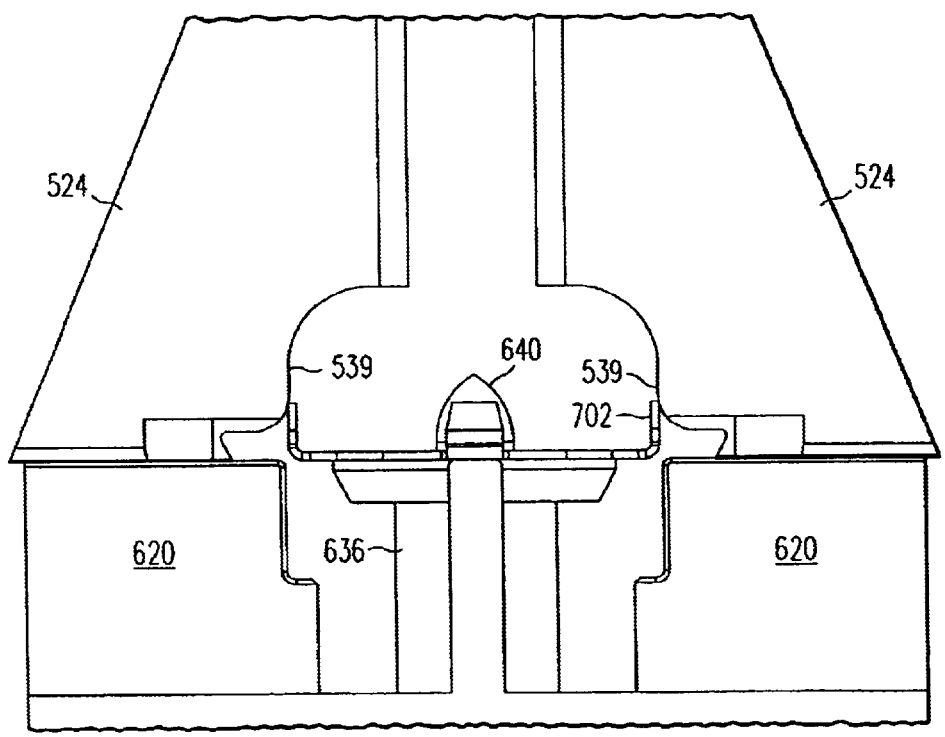
Figure 37C:
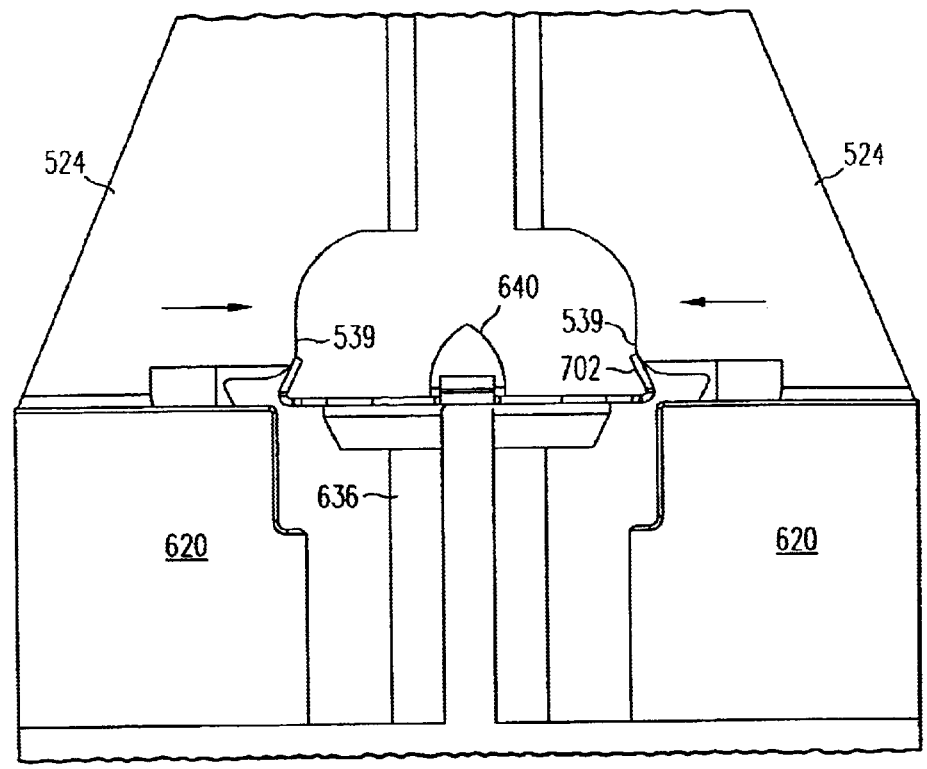
Figure 37D:
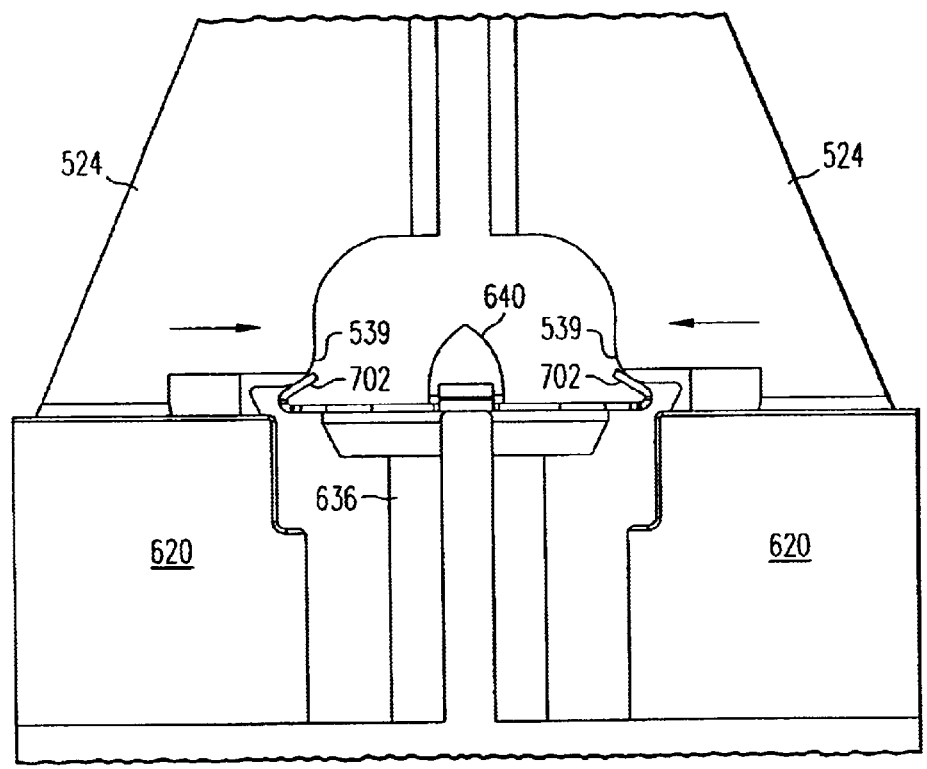
Figure 37E:
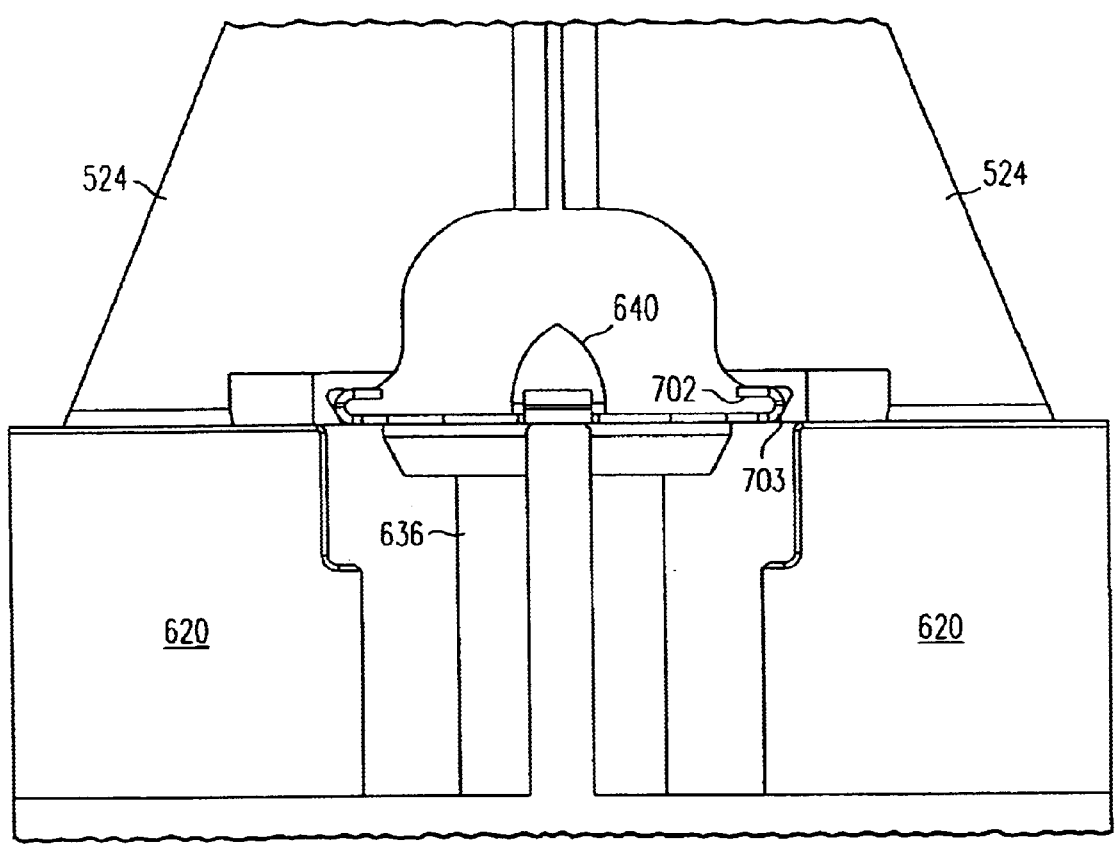

FIG. 37A shows crimping jaws 524 as they are moving downward and approaching the top surfaces 622 of fins 620. In FIG. 37B, the bottom surfaces 538 of crimping jaws 524 have made contact with top surfaces 622 and cam surfaces 539 have made contact with the end of tabs 702. At this point further vertical motion of crimping jaws is essentially prevented, and crimping jaws 524 begin to slide with respect to body 502 in slots 530 (FIG. 32). This forces crimping jaws to move radially inward, as shown in FIG. 37C. Cam surfaces 539 begin to bend tabs 702. This process continues, as shown in FIG. 37D, with the surfaces of tabs 702 sliding downward on cam surfaces 539. As shown in FIG. 37E, the area of contact between tabs 702 and cam surfaces 539 finally reaches a substantially horizontal portion of cam surfaces 539. At this point a base region 703 of each of tabs 702 is contacted by prow 540 (FIG. 33).

As noted above, it is important that tabs 702 be submerged in recessed areas 812, so that surface 813 (see FIG. 11) of hub member 80 can be pressed flat against the surface of a data storage disk without interference from tabs 702. Since metal hub plate 70 is typically made of a metal such as steel which has a spring constant, if the ends of tabs 702 were left in a horizontal condition, they would spring upward after metal hub plate is removed from the crimping tool. The contact between base region 703 of tabs 702 and prow 540 forces the ends of tabs 702 downward into recessed areas 812, so that even with a certain amount of "spring back" tabs 702 remain submerged in recessed areas 812. The dashed lines in FIG. 8 a cross-sectional view of one of tabs 702 after it has been bent into notch 810. Note the gap X1 between the end of tab 702 and hub member 80 and the gap X2 between the inner surface of the bent portion of tab 702 and hub member 80. Gaps X1 and X2 allow differential thermal expansion between metal hub plate 70 and hub member 80 without damage to either metal hub plate 70 or hub member 80.

In this embodiment, the forming of tabs 702 is completed when the edges 536 of crimping jaws 524 (FIGS. 32 and 34) meet, thereby preventing further inward movement crimping jaws 524. In other embodiments, there are other ways of terminating the movement of the crimping jaws.

Thus, using the crimping tool of this invention allows the metal hub plate 70 to be attached to the hub member 80 in a way that fixes the respective axes X1, X2 of these two elements in a substantially co-linear relationship with respect to each other and yet allows differential thermal expansion to occur between the metal hub plate and the hub member (which is typically formed of plastic). Providing four crimping jaws at right angles to each other means that two pairs of jaws are diametrically opposed to each other and this has the advantage that no stress is put on the hub member during the bending of the tabs. Other embodiments may have fewer or more than four crimping jaws.

The embodiments described above are illustrative only, and not limiting. Many alternative embodiments within the scope of this invention will be apparent to those of skill in the art.

What is claimed is:

1. A crimping tool for a metal hub plate comprising:
    a plunger assembly having a central axis and being moveable along said central axis, said plunger assembly including:
    a plurality of crimping jaws positioned radially with respect to said central axis, said crimping jaws being subjected to a force such that said crimping jaws project from an end of said plunger assembly; and
    a plurality of surfaces oriented at an acute angle with respect to said central axis, each of said crimping jaws being slidable on a respective one of said surfaces such that when one of said crimping jaws slides on said respective one of said surfaces, the motion of said crimping jaw relative to the surface has a first component parallel to said axis and a second component perpendicular to said axis said surfaces being oriented such that said crimping jaws move towards said central axis to crimp said metal hub plate when said crimping jaws are moved in a direction opposite to said force; and
    a die for retaining said metal hub plate and positioned in said tool that said crimping jaws contact said die to move said crimping jaws towards said central axis when said plunger assembly is displaced a distance from a retracted position in the direction of said force along said axis.

2. The tool of claim 1 wherein said plunger assembly comprises four crimping jaws oriented at right angles to each other about said axis.

3. The tool of claim 2 wherein each of said crimping jaws comprises a slot and said respective one of said surfaces.

4. The tool of claim 3 wherein each of said crimping jaws comprises a cam surface and a prow.

5. The tool of claim 1 wherein said force is provided by a compression spring.

6. The tool of claim 1, further comprising a swivel body, wherein said plunger assembly is slidable in a hole defined in said swivel body.

7. The tool of claim 1 comprising a compression spring for urging said plunger assembly towards said retracted position.

8. The tool of claim 1 wherein said die comprises a cavity for retaining said metal hub plate.

9. The tool of claim 1 wherein said die comprises a first feature and said metal hub plate comprises a second feature, said first feature mating with said second feature to align said metal hub plate rotationally with respect to said die.

10. The tool of claim 9 wherein said first feature comprises a nub having an arc-shaped surface.

\* \* \* \* \*